United States Patent
Tsuoka et al.

(10) Patent No.: US 12,200,483 B2
(45) Date of Patent: Jan. 14, 2025

(54) CONTROL APPARATUS, RADIO COMMUNICATION SYSTEM, CONTROL METHOD, AND RECORDING MEDIUM HAVING RECORDED PROGRAM

(71) Applicant: NEC Corporation, Tokyo (JP)

(72) Inventors: Hideaki Tsuoka, Tokyo (JP); Tetsuo Yama, Tokyo (JP); Akihisa Kurashima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 599 days.

(21) Appl. No.: 17/436,216

(22) PCT Filed: Jan. 20, 2020

(86) PCT No.: PCT/JP2020/001710
§ 371 (c)(1),
(2) Date: Sep. 3, 2021

(87) PCT Pub. No.: WO2020/188988
PCT Pub. Date: Sep. 24, 2020

(65) Prior Publication Data
US 2022/0132310 A1    Apr. 28, 2022

(30) Foreign Application Priority Data
Mar. 20, 2019   (JP) ................... 2019-053016

(51) Int. Cl.
*G06F 21/00*    (2013.01)
*H04W 8/04*    (2009.01)
(Continued)

(52) U.S. Cl.
CPC ............. *H04W 12/06* (2013.01); *H04W 8/04* (2013.01); *H04W 8/20* (2013.01); *H04W 12/03* (2021.01); *H04W 12/0431* (2021.01)

(58) Field of Classification Search
CPC ......... H04W 12/06; H04W 8/04; H04W 8/20; H04W 12/03; H04W 12/0431;
(Continued)

(56) References Cited

U.S. PATENT DOCUMENTS

| 2006/0089123 A1* | 4/2006 | Frank ................. H04W 12/033 455/411 |
| 2013/0205378 A1* | 8/2013 | Oba ................. H04W 12/0431 726/7 |
| 2016/0314304 A1* | 10/2016 | Hsiao ................. G06F 21/6218 |

(Continued)

FOREIGN PATENT DOCUMENTS

| JP | 2988442 B | 12/1999 |
| JP | 2010-239381 A | 10/2010 |

(Continued)

OTHER PUBLICATIONS

Translation of JP2013198061(A) [JP2012-06557] (Year: 2013).*
(Continued)

*Primary Examiner* — Kendall Dolly
(74) *Attorney, Agent, or Firm* — Sughrue Mion, PLLC

(57) ABSTRACT

In order to provide a control apparatus that enhances security of a radio communication system run by a user, the control apparatus including an acquisition section and a registration section, the acquisition section being configured to acquire subscriber information in which at least authentication information is encrypted, and the registration section being configured to register the acquired subscriber information in a database included in a core network. The control apparatus may further include an authentication section configured to decrypt the encrypted authentication information, and use the decrypted authentication information and authentication information included in a connection request from a terminal apparatus to the core network to authenticate the terminal apparatus.

11 Claims, 23 Drawing Sheets

(51) Int. Cl.
　　　*H04W 8/20*　　　(2009.01)
　　　*H04W 12/03*　　　(2021.01)
　　　*H04W 12/0431*　　(2021.01)
　　　*H04W 12/06*　　　(2021.01)

(58) Field of Classification Search
　　　CPC ....... H04L 63/0442; H04L 9/32; G06F 21/44; H04M 11/00
　　　See application file for complete search history.

(56) References Cited

U.S. PATENT DOCUMENTS

| | | | |
|---|---|---|---|
| 2017/0264439 A1* | 9/2017 | Muhanna | H04L 63/0428 |
| 2018/0013568 A1* | 1/2018 | Muhanna | H04L 9/0822 |
| 2019/0319937 A1* | 10/2019 | Nix | H04W 12/03 |

FOREIGN PATENT DOCUMENTS

| | | |
|---|---|---|
| JP | 2013-198061 A | 9/2013 |
| JP | 2014-158194 A | 8/2014 |
| WO | 2017/152871 A1 | 9/2017 |
| WO | 2020/136857 A1 | 7/2020 |

OTHER PUBLICATIONS

JP Office Action for JP Application No. 2021-506198, mailed on Aug. 2, 2022 with English Translation.
International Search Report for PCT Application No. PCT/JP2020/001710, mailed on Apr. 7, 2020.
English translation of Written opinion for PCT Application No. PCT/JP2020/001710, mailed on Apr. 7, 2020.

* cited by examiner

60: SUBSCRIBER INFORMATION DATABASE

| SIM PROVIDER ID | IMSI | OPc | K VALUE |
|---|---|---|---|
| A01 | B01 | X001 | Y001 |
| A01 | B02 | X002 | Y002 |
| A01 | B03 | X003 | Y003 |
| A01 | B04 | X004 | Y004 |
| A02 | B05 | X005 | Y005 |
| A02 | B06 | X006 | Y006 |
| A02 | B07 | X007 | Y007 |
| A02 | B08 | X008 | Y008 |
| A00 | B00 | X099 | Y099 |

ENCRYPTED AUTHENTICATION INFORMATION

NON-ENCRYPTED AUTHENTICATION INFORMATION

Fig.6

| SIM PROVIDER ID | IMSI | OPc | K VALUE |
|---|---|---|---|
| A01 | B01 |  |  |
| A01 | B02 |  |  |
| A01 | B03 |  |  |
| A01 | B04 |  |  |
| A02 | B05 |  |  |
| A02 | B06 |  |  |
| A02 | B07 |  |  |
| A02 | B08 |  |  |
| A00 | B00 | X099 | Y099 |

Fig.8

| IMSI | NETWORK OPERATOR (CUSTOMER ID) |
|---|---|
| Z0000 | A |
| Z0100 | B |
| Z0200 | C |
| .. | .. |

Fig.18

| NETWORK OPERATOR (CUSTOMER ID) | INDIVIDUAL INFORMATION |
|---|---|
| A | M01 |
| B | M02 |
| C | M03 |
| ... | ... |

Fig.19

| NETWORK OPERATOR | COMMON KEY |
|---|---|
| A | Key1 |
| B | Key2 |
| C | Key3 |
| ... | ... |

Fig.20

CONTROL APPARATUS, RADIO COMMUNICATION SYSTEM, CONTROL METHOD, AND RECORDING MEDIUM HAVING RECORDED PROGRAM

This application is a National Stage Entry of PCT/JP2020/001710 filed on Jan. 20, 2020, which claims priority from Japanese Patent Application 2019-053016 filed on Mar. 20, 2019, the contents of all of which are incorporated herein by reference, in their entirety.

BACKGROUND

Technical Field

The present invention relates to a control apparatus, a radio communication system, a control method, and a recording medium having recorded a program.

Background Art

In recent years, as a mobile network system, Long Term Evolution (LTE)/Evolved Packet Core (EPC) defined by the Third Generation Partnership Project (3GPP) has become remarkably widespread.

In the mobile network system such as LTE, usually, telecommunications operators (carriers) construct and manage base stations, core networks, and the like, and provide radio connection for users. In other words, mobile communication operators referred to as Mobile Network Operators (MNOs) construct communication line networks, and provide communication services. Further, in recent years, provision of communication services by Mobile Virtual Network Operators (MVNOs) that borrow communication networks from the MNOs has also been widely performed.

In addition, companies and the like have started to construct, by themselves, mobile radio communication networks (hereinafter simply referred to as "radio communication networks") based on the technology of mobile phones, independently of the MNO and the MVNO. Specifically, construction of radio communication networks referred to as private LTE has been under development.

PTL 1 discloses a technique related to handling of subscriber data of a radio communication system (mobile communication system). In the technique of PTL 1, subscriber data is separated into a subscriber index table using subscriber numbers as keys and a subscriber data table referred to from the subscriber index table. In PTL 1, two tables as described above are prepared, and in the subscriber data table, data is accommodated at random at address positions associated by the subscriber index table, so that a necessary data region is minimized.

CITATION LIST

Patent Literature

[PTL 1] JP 2988442 B

SUMMARY

Technical Problem

As described above, construction of radio communication networks by companies and the like, referred to as the private LTE, has been started. In the private LTE, apparatuses necessary for construction of the radio communication network are set up at the location and premises of the company and the like. Specifically, a base station being nodes of a Radio Access Network (RAN) and a core network node (for example, a Mobility Management Entity (MME)) are set up in the premises of the company and the like.

Here, in the private LTE, control of the base station and management related to users are based on management, control, and the like of existing LTE. Accordingly, authenticating terminals that can use the private LTE is required even in the private LTE. Specifically, a Subscriber Identity Module (SIM) provider needs to issue a SIM card, and the SIM card need to be inserted in a terminal.

The SIM provider provides authentication information for implementing user authentication (subscriber authentication) for operators (network operators) of the private LTE. The authentication information is stored in the core network, and is occasionally referred to when communication service is provided for the terminal. Specifically, the authentication is performed as follows: the authentication information is stored in a Home Subscriber Server (HSS), and the MME compares the authentication information stored in the SIM card of the terminal and the authentication information stored in the HSS.

Here, apparatuses necessary for provision of communication services by the Mobile Network Operator (MNO) and the Mobile Virtual Network Operator (MVNO) are in many cases set up in the premises or the like managed by the carrier. Thus, a user who receives provision of services from the MNO or the like cannot directly access the HSS and the like.

In contrast, in the private LTE, the core network and the like are in many cases set up in the premises of a user, and management of the HSS storing the authentication information and the like are also entrusted to the user. If security of the communication line network in which the private LTE is constructed is nearly as high as security of the MNO and the like, there are only minor concerns about information leak and the like even if the core network and the HSS are installed in the premises or the like of the user. In other words, there is a high probability of information leak when security measures in the private LTE are not as strong as security measures of the communication line network provided by a carrier.

For example, in PTL 1, there is no reference to encryption and conversion of subscriber data including authentication information. Thus, if the subscriber data used in the private LTE is stored in a database in a state of plaintext as disclosed in PTL 1, there is a high possibility of information leak when the database is attacked.

The present invention has a main example object to provide a control apparatus, a radio communication system, a control method, and a recording medium having recorded thereon a program that enable enhancement of security of a radio communication system run by a user.

Solution to Problem

According to a first example aspect, there is provided a control apparatus including an acquisition means for acquiring subscriber information in which at least authentication information is encrypted, and a registration means for registering the acquired subscriber information in a database included in a core network.

According to a second example aspect, there is provided a radio communication system including an acquisition means for acquiring subscriber information in which at least authentication information is encrypted, and a registration means for registering the acquired subscriber information in a database included in a core network.

According to a third example aspect, there is provided a control method in a control apparatus controlling mobility of a terminal apparatus, the method including acquiring subscriber information in which at least authentication information is encrypted, and registering the acquired subscriber information in a database included in a core network.

According to a fourth example aspect, there is provided a recording medium having recorded thereon a program causing a computer installed in a control apparatus controlling mobility of a terminal apparatus to execute: processing of acquiring subscriber information in which at least authentication information is encrypted, and processing of registering the acquired subscriber information in a database included in a core network.

Advantageous Effects of Invention

According to each example aspect of the present invention, there are provided a control apparatus, a radio communication system, a control method, and a recording medium having recorded thereon a program that enable enhancement of security of a radio communication system run by a user. Note that, according to the present invention, instead of or together with the above effects, other effects may be exerted.

BRIEF DESCRIPTION OF THE DRAWINGS

FIG. 6 is a diagram illustrating an example of information stored in a subscriber information database according to the first example embodiment;

FIG. 8 is a diagram for illustrating operation of the database management section according to the first example embodiment;

FIG. 18 is a diagram for illustrating operation of the control apparatus according to the fourth example embodiment;

FIG. 19 is a diagram for illustrating operation of the control apparatus according to the fourth example embodiment;

FIG. 20 is a diagram for illustrating operation of the control apparatus according to the fourth example embodiment;

DESCRIPTION OF THE EXAMPLE EMBODIMENTS

Figure 1:
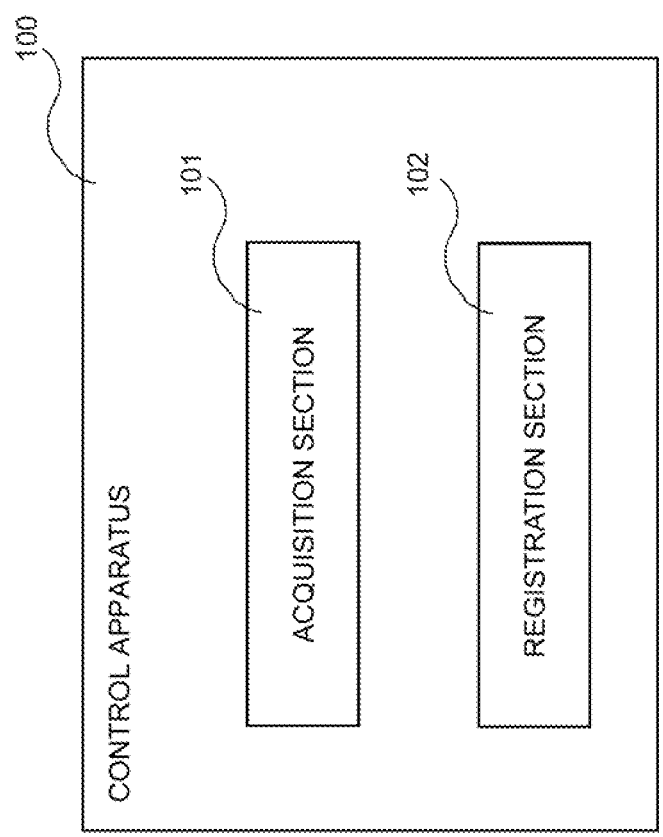
FIG. 1 is a diagram for illustrating an overview of an example embodiment.

First of all, an overview of an example embodiment will be described. Note that the reference signs in the drawings provided for the overview are provided for the sake of convenience for each element as an example in order to promote better understanding, and are not to limit description of the overview in any means. Note that, in the Specification and drawings, elements to which similar descriptions are applicable are denoted by the same reference signs, and overlapping descriptions may hence be omitted.

A control apparatus 100 according to an example embodiment includes an acquisition section 101 and a registration section 102 (see FIG. 1). The acquisition section 101 acquires subscriber information in which at least authentication information is encrypted. The registration section 102 registers the acquired subscriber information in a database included in a core network.

The control apparatus 100 is an apparatus that mainly controls mobility of a terminal apparatus. The encrypted authentication information is registered in the database by the control apparatus 100. Thus, even if the control apparatus 100 and the database are used in a radio communication system that is managed and run by a user, the authentication information is appropriately protected. When the control apparatus 100 is installed in a radio communication system such as the private LTE and in the unlikely event that the authentication information leaks from the database, the leaked authentication information is encrypted, and thus a third party cannot understand the authentication information. In other words, security of the radio communication system run by a user is enhanced.

Specific example embodiments will be described below in further detail with reference to the drawings.

First Example Embodiment

Figure 2:
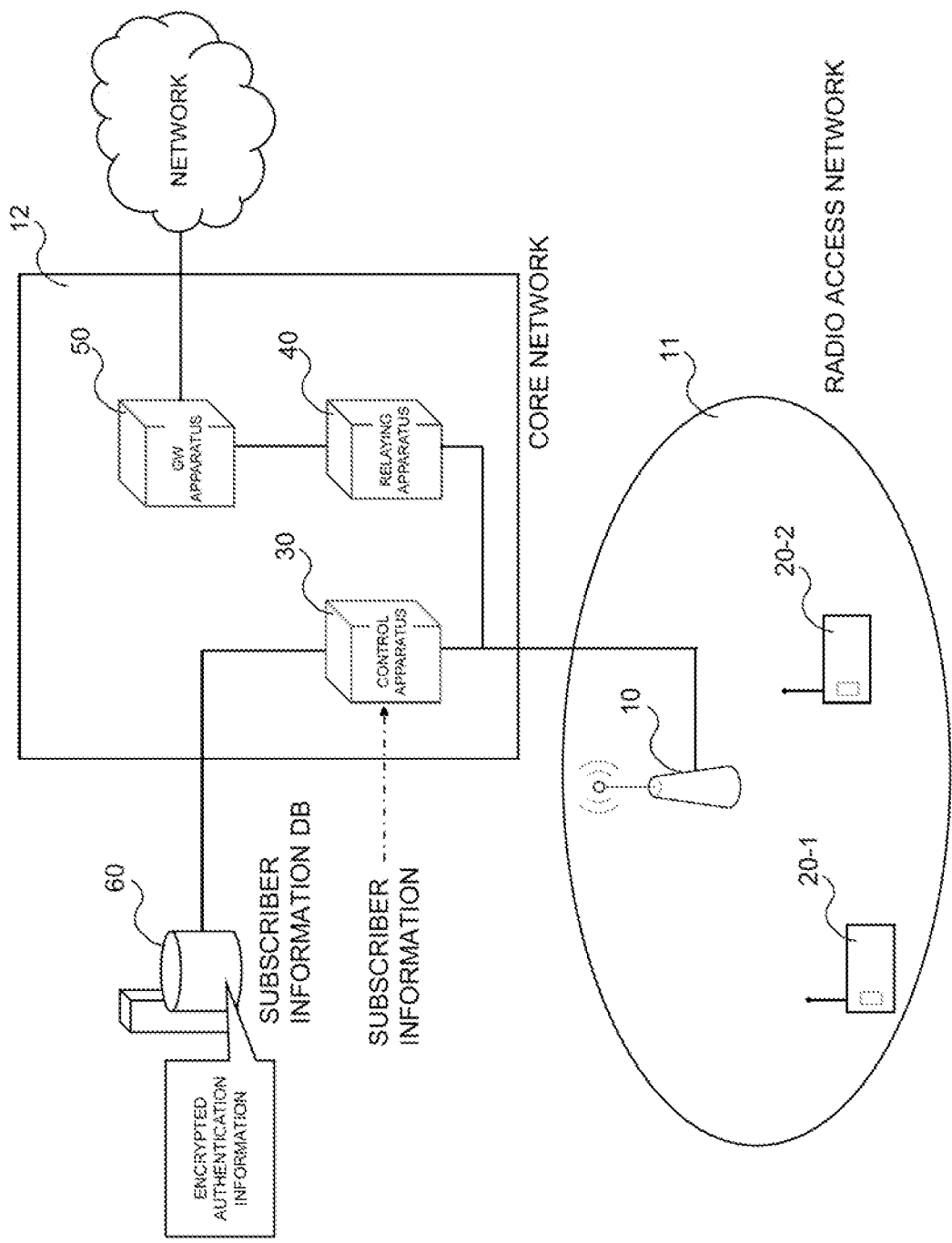
FIG. 2 is a diagram illustrating an example of a schematic configuration of a radio communication system according to a first example embodiment.

A first example embodiment will be described in further detail with reference to the drawings.
<Configuration of System>
FIG. 2 is a diagram illustrating an example of a schematic configuration of a radio communication system according to the first example embodiment. The radio communication system according to the first example embodiment is a system in which an end user performs operation and management of the system. Specifically, the end user installs a node that configures a radio communication system in their premises or the like, and performs management of the node and the like. Note that the management of the node performed by the end user includes management of an apparatus installed on the cloud.

The first example embodiment presupposes a radio communication system in which an entity (end user) such as a company is a network operator. However, this is not to limit operators of the radio communication system, and the disclosure of the present application may be applied to radio communication systems that are operated and managed by an MNO, an MVNO, and the like. The presupposition is not to exclude the radio communication systems managed and operated by the MNO and the MVNO.

With reference to FIG. 2, the radio communication system includes a radio access network 11 and a core network 12.

The radio access network 11 includes a base station 10 as a node. The base station 10 provides radio connection for terminal apparatuses 20-1 and 20-2. Note that, if there are no special reasons for distinguishing the terminal apparatuses 20-1 and 20-2 in the following description, the terminal apparatuses 20-1 and 20-2 are simply referred to as "terminal apparatus 20".

The terminal apparatus 20 performs radio communication with the base station 10 when the terminal apparatus 20 is located within a coverage of the base station 10. For example, the terminal apparatus 20 is a User Equipment (UE), examples of which include a mobile terminal apparatus, such as a smartphone, a mobile phone, a gaming machine, and a tablet, a computer (a personal computer, a laptop computer). Alternatively, the terminal apparatus 20 may be an Internet of Things (IoT) terminal, a Machine Type Communication (MTC) terminal, and the like that transmit radio waves. However, this is not to limit the terminal apparatus 20 to these examples. The terminal apparatus 20 according to the disclosure of the present application can be any device that transmits radio waves.

Note that the system configuration illustrated in FIG. 2 is merely an example, and this, as a matter of course, is not to limit the number of base stations 10 or terminal apparatuses 20. For example, the number of terminal apparatuses 20 included in the system may be one, or may be three or more.

The core network 12 is a network that connects the base station 10 and an external network (for example, the Internet). The core network 12 includes network nodes such as a control apparatus 30, a relaying apparatus 40, and a Gateway (GW) apparatus 50.

The core network 12 is divided into a control plane (C-Plane) in which signals for the start and the end of communication performed by the terminal apparatus 20 and signals necessary for handover are transmitted, and a user plane (U-Plane) in which user data is transmitted.

The control apparatus 30 transmits and receives signals necessary for communication between the base station 10 and the control plane. The control apparatus 30 mainly controls mobility of the terminal apparatus 20. One example of the control performed by the control apparatus 30 is authentication (subscriber authentication) of the terminal apparatus 20.

Specifically, the control apparatus 30 performs subscriber authentication by comparing authentication information described in a SIM card inserted into the terminal apparatus 20 obtained via the base station 10 and authentication information obtained from a subscriber information database (Data Base (DB)) 60. The details of the subscriber authentication performed by the control apparatus 30 will be described later.

The relaying apparatus 40 is an apparatus that relays user data between the base station 10 and the user plane.

The gateway apparatus 50 is located at the boundary between the core network 12 and an external network, and transmits and receives packets related to the user data.

The subscriber information database 60 stores subscriber information. Input and output of information in the subscriber information database 60 are controlled by the control apparatus 30.

In a case in which the radio communication system according to the first example embodiment is a system of LTE, the control apparatus 30 corresponds to a Mobility Management Entity (MME). The relaying apparatus 40 corresponds to a Serving Gateway (S-GW). The gateway apparatus 50 corresponds to a PDN Gateway (P-GW). The subscriber information database 60 corresponds to a Home Subscriber Server (HSS).

Note that, as a matter of course, the radio communication system according to the disclosure of the present application is not to be limited to LTE. The disclosure of the present application can also be applied to radio communication systems prior to LTE (for example, the Third Generation (3G)) and radio communication systems of the next generation (for example, the Fifth Generation (5G)).

In a case in which the radio communication system is 5G, the control apparatus 30 corresponds to an Access and Mobility Management Function (AMF), and the subscriber information database 60 corresponds to a Unified Data Management (UDM).

In FIG. 2, the subscriber information database 60 is not illustrated as a node of the core network 12, but the subscriber information database 60 may be handled as a core network node. The subscriber information database 60 may be handled as one of elements in the core network 12.
<General Operation of System>
With reference to FIG. 2, general operation of the radio communication system according to the first example embodiment will be described.

The operation of the radio communication system according to the first example embodiment includes two phases.

The first phase is a phase in which information (hereinafter referred to as subscriber information) related to the terminal apparatus 20 that receives provision of radio communication services from the base station 10 is registered in the subscriber information database 60.

The second phase is a phase in which the terminal apparatus 20 that requests provision of radio connection services is authenticated.
<Registration Phase>
Prior to operating the system, a network operator (a company or the like that operates and manages the radio communication system by itself) requests a SIM provider to generate the subscriber information. The SIM provider generates the subscriber information in response to the request.

The network operator also provides, for the SIM provider, a public key generated by the core network 12 (more concretely, the control apparatus 30) together with customer information.

The subscriber information generated by the SIM provider includes an Integrated Circuit Card ID (ICCID) being information specific to a SIM card, an International Mobile Subscriber Identity (IMSI) being a contract identification number, authentication information, and the like. The authentication information is information that is used to verify (prove) whether or not the terminal apparatus in an attempt to use a radio communication network has validity thereof. One example of the authentication information is, for example, information referred to as an OPc/K value.

The SIM provider generates the subscriber information according to the customer information provided from the network operator. The SIM provider writes the generated subscriber information in a SIM card and delivers to the network operator. The SIM card is inserted into the terminal apparatus 20.

The subscriber information generated by the SIM provider is provided for the network operator, and the network operator or the SIM provider registers the subscriber information in the core network 12 (more concretely, the control apparatus 30). In this case, the SIM provider encrypts at least the authentication information from among the generated pieces of subscriber information. More specifically, the SIM provider generates the authentication information in ciphertext by using the public key acquired from the core network 12 in advance. Note that, instead of the public key, a common key arranged between the SIM provider and the network operator may be used.

The control apparatus 30 acquires the subscriber information in which the authentication information is encrypted (the subscriber information including the authentication information encrypted by an external apparatus by using the public key). The control apparatus 30 registers the acquired subscriber information (the subscriber information in which the authentication information is encrypted) in the subscriber information database 60.

<Authentication Phase>

When the control apparatus 30 receives a connection request (attach request) from the terminal apparatus 20, the control apparatus 30 acquires, via the base station 10, the subscriber information of the SIM card inserted in the terminal apparatus 20.

The control apparatus 30 searches the subscriber information database 60 by using a part of (for example, the IMSI) the acquired subscriber information as a search key, and acquires the subscriber information corresponding to the terminal apparatus 20 from which the connection request is received.

As described above, at least the authentication information from among the subscriber information is encrypted. Therefore, processing of decrypting the encrypted authentication information is required for the control apparatus 30. Specifically, the control apparatus 30 decrypts the authentication information by using a private key that corresponds to the public key distributed to the SIM provider. Note that, instead of the private key, a common key arranged between the SIM provider and the network operator may be used.

Subsequently, the control apparatus 30 compares the authentication information related to the terminal apparatus 20 that has issued the connection request and the authentication information acquired from the subscriber information database 60. As a result of the comparison, when the two pieces of authentication information match, the control apparatus 30 accepts the connection request of the terminal apparatus 20. When the two pieces of authentication information do not match, the control apparatus 30 rejects the connection request of the terminal apparatus 20.

<Configuration of Control Apparatus>

Next, internal configuration (processing configuration) of the control apparatus 30 will be described.

Figure 3:
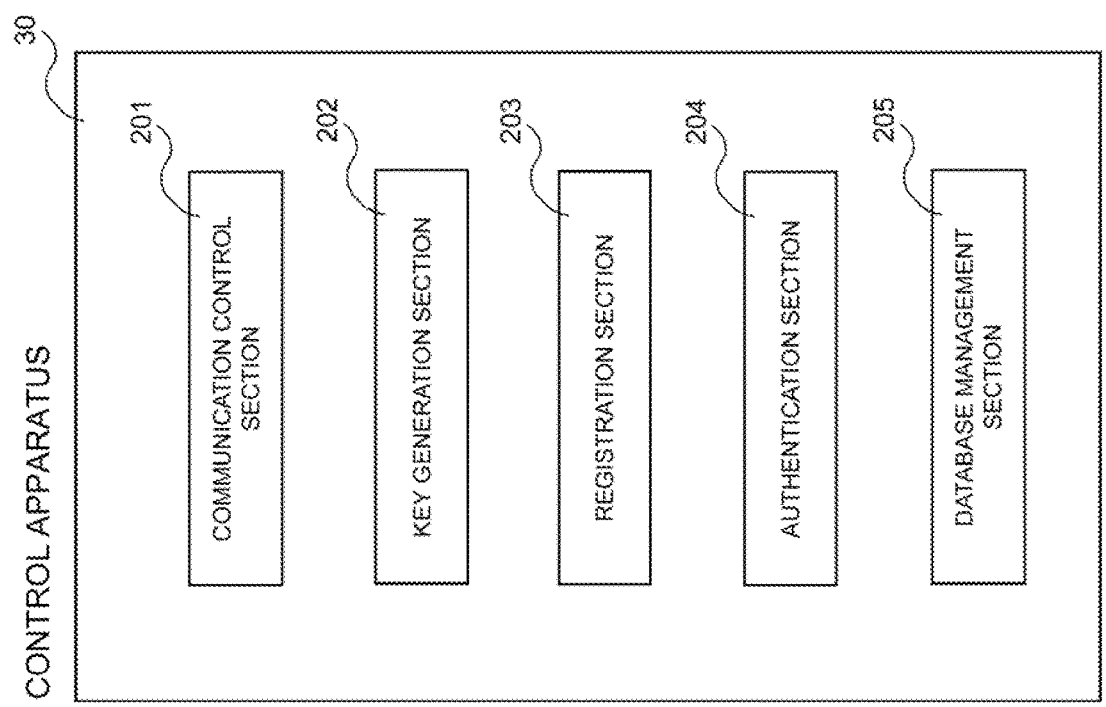
FIG. 3 is a diagram illustrating an example of a processing configuration of a control apparatus according to the first example embodiment.

FIG. 3 is a diagram illustrating an example of processing configuration (processing module) of the control apparatus 30 according to the first example embodiment. With reference to FIG. 3, the control apparatus 30 includes a communication control section 201, a key generation section 202, a registration section 203, an authentication section 204, and a database management section 205.

The communication control section 201 is means for controlling communication with other apparatuses (for example, the base station 10, the subscriber information database 60, and the like). The communication control section 201 has the function of the acquisition section 101 described above.

The key generation section 202 is means for generating keys used for encryption and decryption of the subscriber information. Specifically, the key generation section 202 generates a public key to be distributed to the SIM provider, and a private key to be paired with the public key. The generated public key is distributed to the SIM provider. Note that the key generation section 202 operates such that different sets (pairs) of the public key and the private key are generated if the SIM providers are different. For example, the key generation section 202 generates the public key and the private key different for each SIM provider by using information specific to the SIM provider as a "seed" of the key generation. Instead of the set (pair) of the public key and the private key, a common key arranged between the SIM provider and the network operator may be used.

The key generation section 202 may distribute the generated public key to the SIM provider via a network, or may store the public key in a storage medium such as a Universal Serial Bus (USB) memory to distribute the key to the SIM provider through use of the storage medium.

The key generation section 202 stores the generated private key in a storage section (not illustrated in FIG. 3) or the like in its apparatus.

The registration section 203 is means for registering the subscriber information acquired from the SIM provider in the subscriber information database 60.

There may be various possible methods for the registration section 203 to acquire the subscriber information from the SIM provider.

Figure 4:
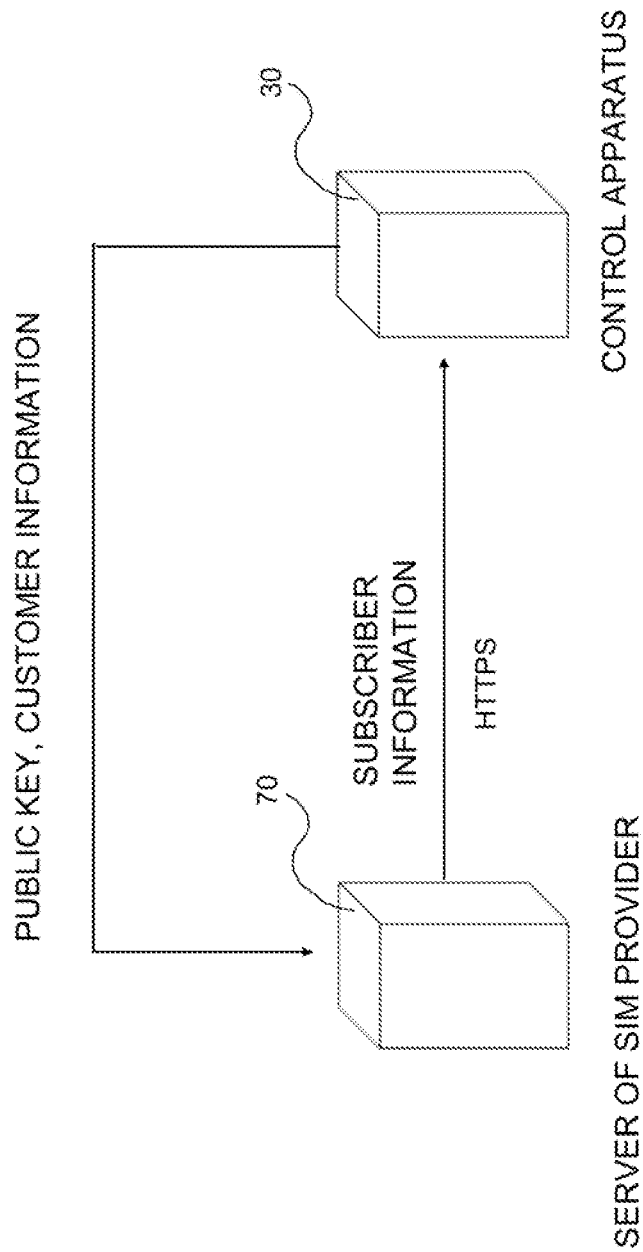
FIG. 4 is a diagram for illustrating operation of the control apparatus according to the first example embodiment.

For example, the registration section 203 acquires the subscriber information from the SIM provider via a network (see FIG. 4). In this case, as illustrated in FIG. 4, the control apparatus 30 and a server 70 of the SIM provider are connected with a network, and the subscriber information is provided via the network. Note that it is desirable that the control apparatus 30 and the server 70 of the SIM provider be connected with a secure communication path such as Hypertext Transfer Protocol Secure (HTTPS).

As described above, at least the authentication information from among the subscriber information is encrypted. The public key for the encryption is provided for the server 70 of the SIM provider in advance.

Figure 5:
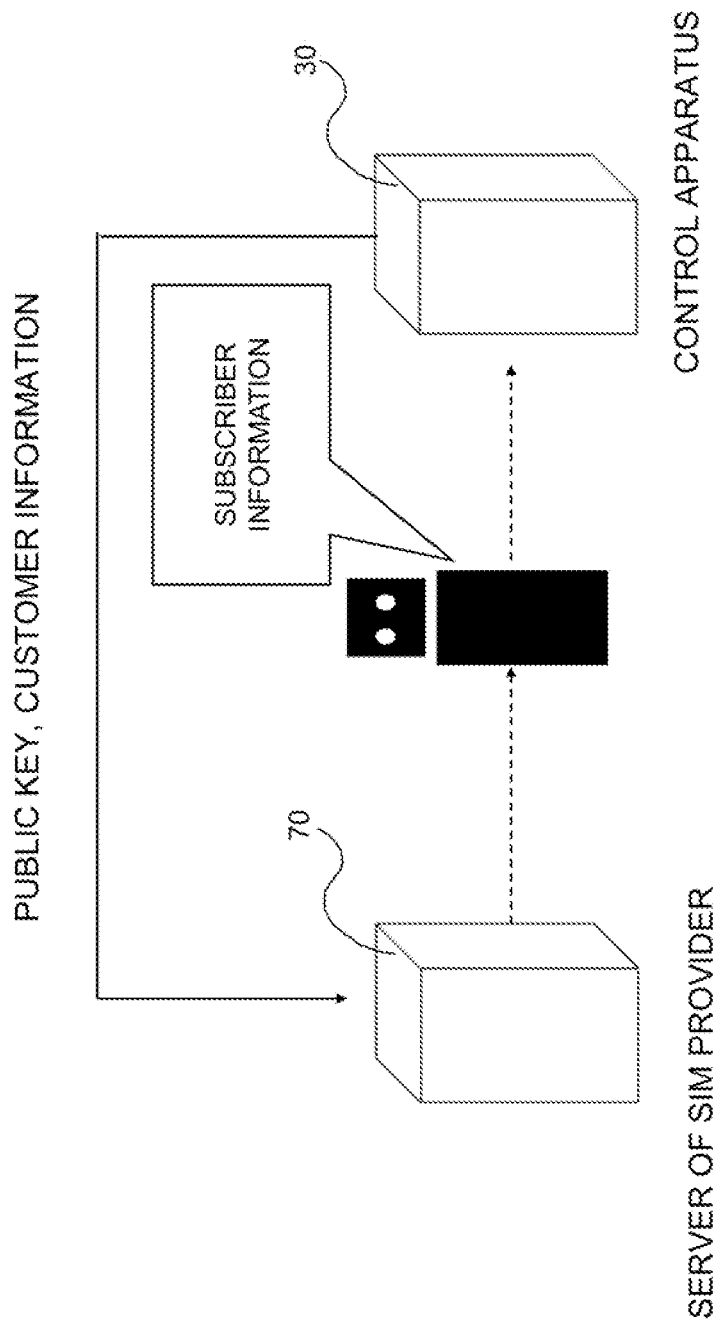
FIG. 5 is a diagram for illustrating operation of the control apparatus according to the first example embodiment.

The registration section 203 may acquire the subscriber information by using a storage medium such as a USB memory (see FIG. 5). Note that, in such a case, it is desirable that the subscriber information given a password be stored in the storage medium in consideration of security.

Alternatively, a system administrator may access a website provided by the SIM provider with a terminal such as a smartphone, and a server of the website may transmit a two-dimensional code including contents of the subscriber information to the terminal. The system administrator may cause the two-dimensional code to be displayed on a screen of the smartphone, and a core network apparatus (control apparatus 30) may read the subscriber information from the two-dimensional code. One example of the two-dimensional code is a Quick Response (QR) code (registered trademark).

When the registration section 203 stores the acquired subscriber information in the subscriber information database 60, a database as illustrated in FIG. 6 is constructed.

With reference to FIG. 6, each entry of the subscriber information database 60 includes fields of a SIM provider Identifier (ID), an IMSI, OPc, and a K value.

The SIM provider ID is information for identifying the SIM provider that generates the subscriber information. For example, the SIM provider ID may be generated based on an issuer identification number (IIN) that is included in the ICCID being a piece of data written in the SIM, or may be determined separately through arrangement with the SIM provider. For example, correspondence between the ICCID included in the subscriber information and the SIM provider is stored in the storage section of the control apparatus 30 in advance, and the registration section 203 refers to the information as appropriate to generate the SIM provider ID.

The authentication information out of the subscriber information is encrypted by the SIM provider. The registration section 203 registers the encrypted authentication information in the subscriber information database 60 as it is (without applying any processing).

Note that, as illustrated in FIG. 6, different SIM provider IDs may be registered in the subscriber information database 60. This indicates that the SIM card is distributed from one SIM provider to a plurality of network operators. In other words, pieces of subscriber information generated by a plurality of SIM providers may be registered in the subscriber information database 60. Note that, as a matter of course, only the subscriber information generated by a specific SIM provider may be registered in the subscriber information database 60.

In principle, the registration section 203 registers the encrypted authentication information in the subscriber information database 60; however, there are exceptions. For example, the subscriber information generated for the test purpose of the radio communication system need not be encrypted.

In such a case, in order to enable distinguishing between encrypted authentication information and non-encrypted authentication information, the registration section 203 may configure a predetermined value for the SIM provider ID. For example, in the example of FIG. 6, in order to enable distinguishing of the subscriber information for the test purpose, "A00" is used as the SIM provider ID.

With reference to FIG. 6, the authentication information for the test purpose is stored in the subscriber information database 60 in a state of being not encrypted (in a state of plaintext). In other words, by checking the SIM provider ID, whether or not corresponding authentication information is encrypted can be determined.

Note that the subscriber information for the test purpose is not information provided by the SIM provider. Accordingly, the network operator (system administrator) may directly input the subscriber information for the test purpose to the control apparatus 30. For example, the network operator may input the subscriber information by using a storage medium such as a USB memory, or may input the subscriber information manually with the use of a keyboard or the like.

FIG. 3 is referred to again for description. The authentication section 204 is means for performing authentication of the terminal apparatus 20 that has issued the connection request. The authentication section 204 acquires the subscriber information included in the connection request. More specifically, the authentication section 204 acquires at least an IMSI and authentication information (OPc, K value) from the subscriber information.

The authentication section 204 searches the subscriber information database 60 by using the acquired IMSI as a search key.

When there is an entry that is hit for the search key, the subscriber information database 60 returns each field (SIM provider ID, IMSI, OPc, K value) of the entry to the authentication section 204. When there is no entry that is hit for the search key, the subscriber information database 60 returns indication of no hit entry to the authentication section 204.

When the authentication section 204 succeeds in acquisition of the subscriber information from the subscriber information database 60, the authentication section 204 decrypts the encrypted authentication information out of the subscriber information. Specifically, the authentication section 204 decrypts the authentication information by using a private key stored in the storage section.

Subsequently, the authentication section 204 compares the authentication information acquired from the terminal apparatus 20 via the base station 10 and the decrypted authentication information, to perform authentication of the terminal apparatus 20. The authentication section 204 reports a result of the authentication (authentication success or failure) to the terminal apparatus 20 via the base station 10.

The database management section 205 is means for controlling and managing the subscriber information database 60. The database management section 205 generates a Graphical User Interface (GUI) for the system administrator or the like to manage the subscriber information database 60, for example.

Figure 7:
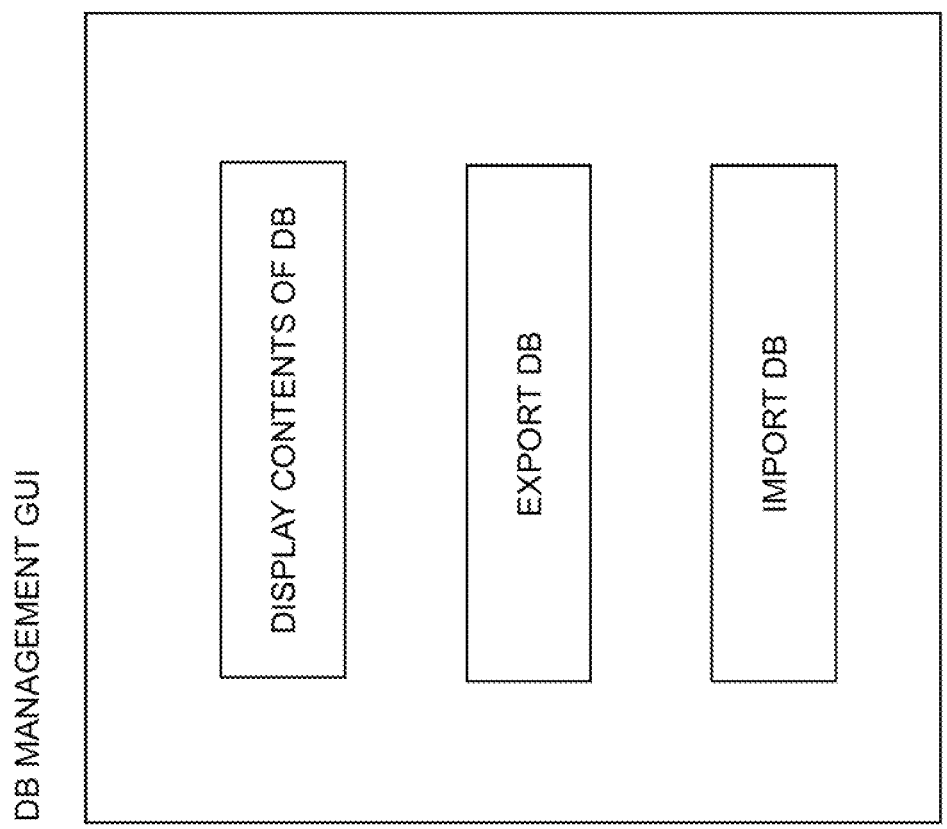
FIG. 7 is a diagram illustrating an example of display by a database management section according to the first example embodiment.

FIG. 7 is a diagram illustrating an example of display by the database management section 205 according to the first example embodiment. As illustrated in FIG. 7, the database management section 205 displays a menu for managing the subscriber information database 60.

When the database management section 205 receives a command related to "display contents of database", the database management section 205 accesses the subscriber information database 60, and acquires information stored in the database. Subsequently, the database management section 205 displays the acquired information on a liquid crystal monitor or the like.

The database management section 205 may switch methods of display depending on whether or not the authentication information is encrypted. As described above, whether or not the authentication information of the information stored in the subscriber information database 60 is encrypted can be determined with reference to the SIM provider ID.

Accordingly, the database management section 205 can perform such operation that the database management section 205 hides the authentication information regarding entries in which the authentication information is encrypted, and displays the authentication information regarding entries in which the authentication information is not encrypted. In this case, the database management section 205 performs display as illustrated in FIG. 8, for example. With reference to FIG. 8, pieces of authentication information other than the piece of authentication information for the test purpose are encrypted, and thus those pieces of information are hidden.

When the database management section 205 receives a command related to "export from database", the database management section 205 accesses the subscriber information database 60, and acquires information stored in the database. Subsequently, the database management section 205 stores the acquired information in another database (transmits the acquired information to a database server).

When the database management section 205 receives a command related to "import to database", the database management section 205 accesses a database in which the subscriber information is backed up, and acquires information stored in the database. Subsequently, the database management section 205 registers (writes) the acquired information in the subscriber information database 60.

Figure 9:
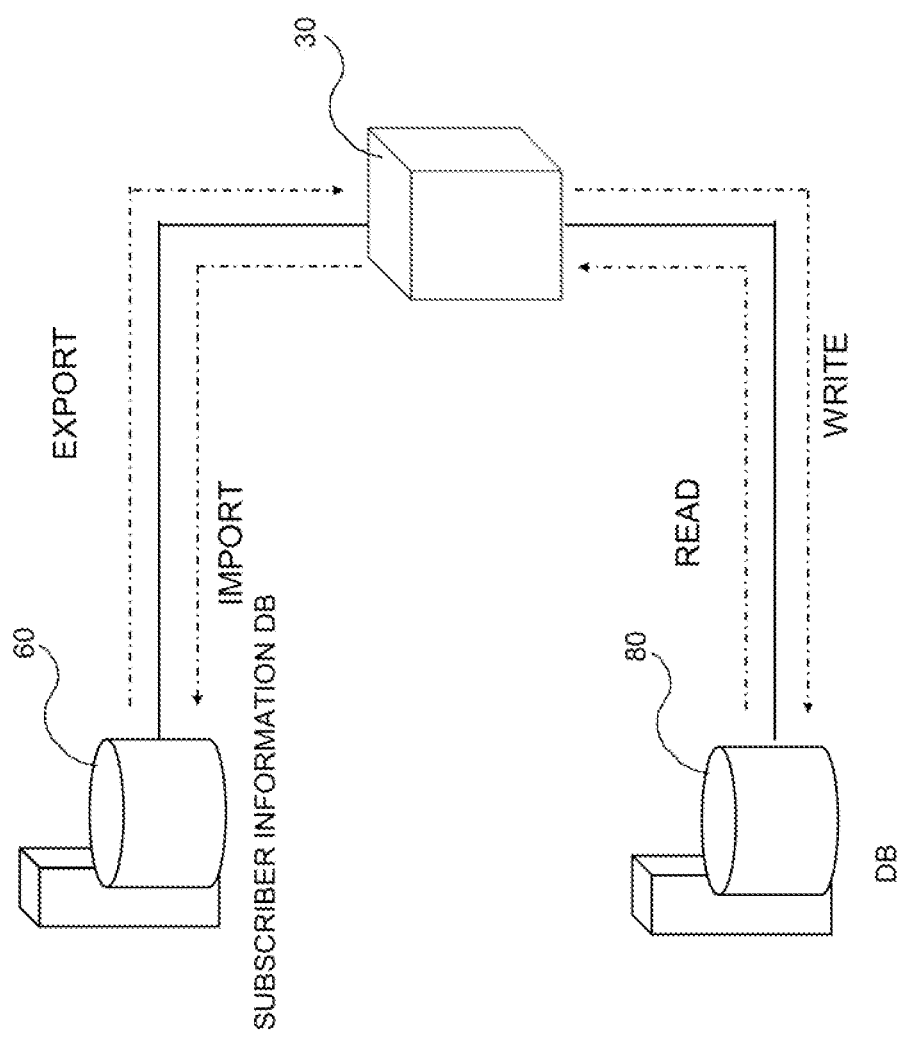
FIG. 9 is a diagram for illustrating operation of the database management section according to the first example embodiment.

The outline of these operations of export and import of the database performed by the database management section 205 is as illustrated in FIG. 9. Note that the format of data input and output by the database management section 205 can be any format. For example, text data may be stored in the subscriber information database 60, and reading and writing of the text data may be performed.

A database 80 illustrated in FIG. 9 can be used as a backup of the subscriber information database 60.

Alternatively, a redundant system can be configured by the database 80 and the subscriber information database 60. In this case, the database management section 205 performs control so that two databases synchronize with each other. In addition, the database management section 205 transmits and receives a heartbeat signal to and from a database of an active system, and performs alive monitoring related to the database of the active system, for example.

When the control apparatus 30 detects occurrence of failure in the database of the active system as a result of the alive monitoring, the control apparatus 30 switches an access destination database to a database of a standby system.

Note that the authentication information remains encrypted while being stored in the database, and data can be exported and imported through an interface included in the regular database (database server). Specifically, in the database side, there is no difference between handling of encrypted authentication information and handling of non-encrypted authentication information, and the data can be input and output by using a command or the like usually employed in the database server.

The authentication information that needs to be concealed is encrypted, and thus even if there is a leak of information from the database, the authentication information is by no means known to a third party.

Note that the control apparatus 30 can be implemented by adding various processing functions (registration function, authentication function, and the like) described in the above to the MME defined according to 3GPP or the like. Thus, description related to other functions of the control apparatus 30 is omitted.

<Configuration of Other Apparatuses>

Apparatuses other than the control apparatus 30 constituting the radio communication system according to the first example embodiment can be implemented by existing apparatuses, and thus description of processing configuration thereof and the like is omitted. It is only necessary that existing methods be used for generation of the subscriber information performed by the SIM provider, and that the SIM provider according to the disclosure of the present application generate the authentication information in ciphertext. Thus, detailed description related to the SIM provider and the server 70 of the SIM provider is omitted.

<Operation of System>

Next, with reference to the drawings, operation of the radio communication system according to the first example embodiment will be described.

Figure 10:
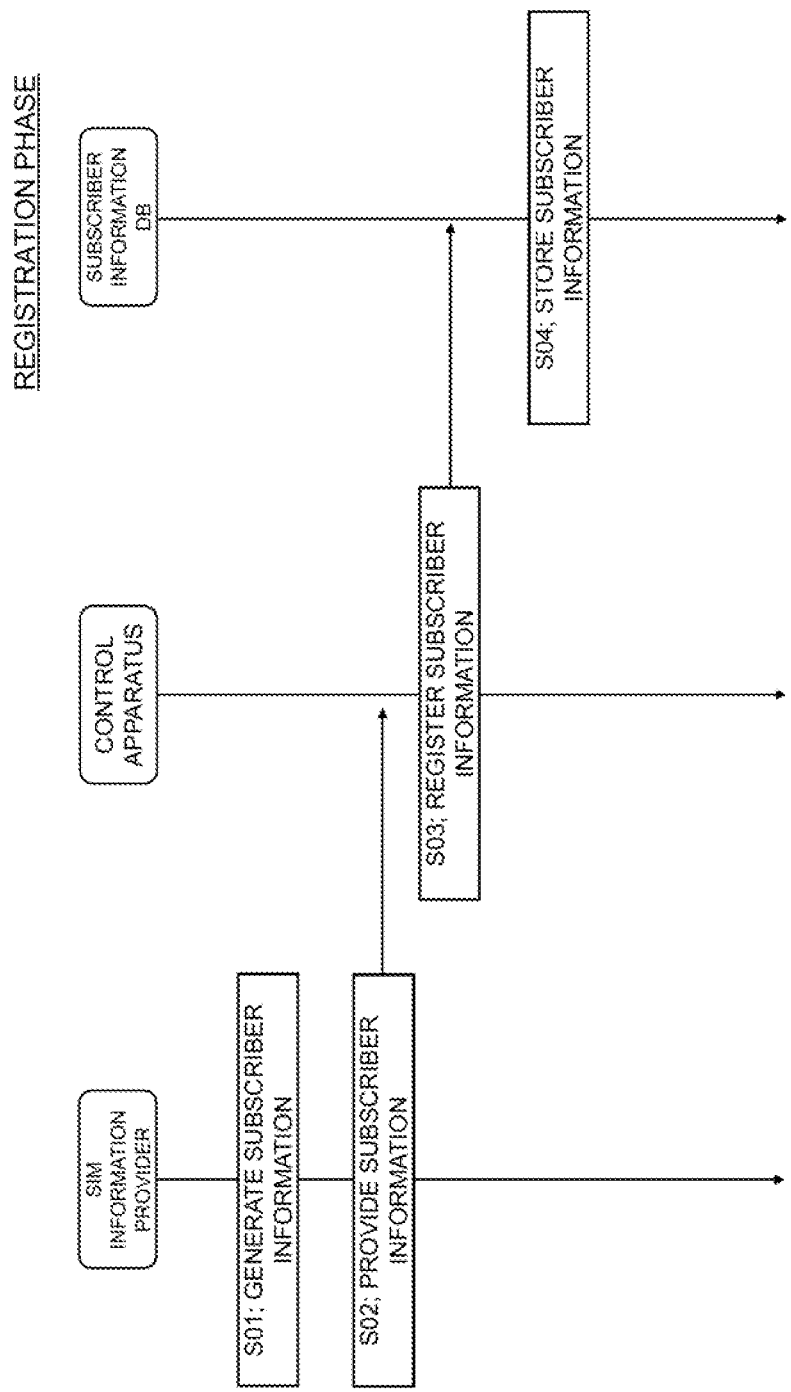
FIG. 10 is a sequence diagram illustrating an example of operation related to registration phase of the radio communication system according to the first example embodiment.

FIG. 10 is a sequence diagram illustrating an example of operation related to the registration phase of the radio communication system according to the first example embodiment.

First, the SIM provider generates subscriber information (Step S01). In this case, the SIM provider encrypts at least the authentication information from among the subscriber information. The SIM provider provides the generated subscriber information for the control apparatus 30 (Step S02).

When the control apparatus 30 acquires the subscriber information in which the authentication information is encrypted, the control apparatus 30 registers the subscriber information in the subscriber information database 60 (Step S03).

The subscriber information database 60 stores the subscriber information (Step S04).

Figure 11:
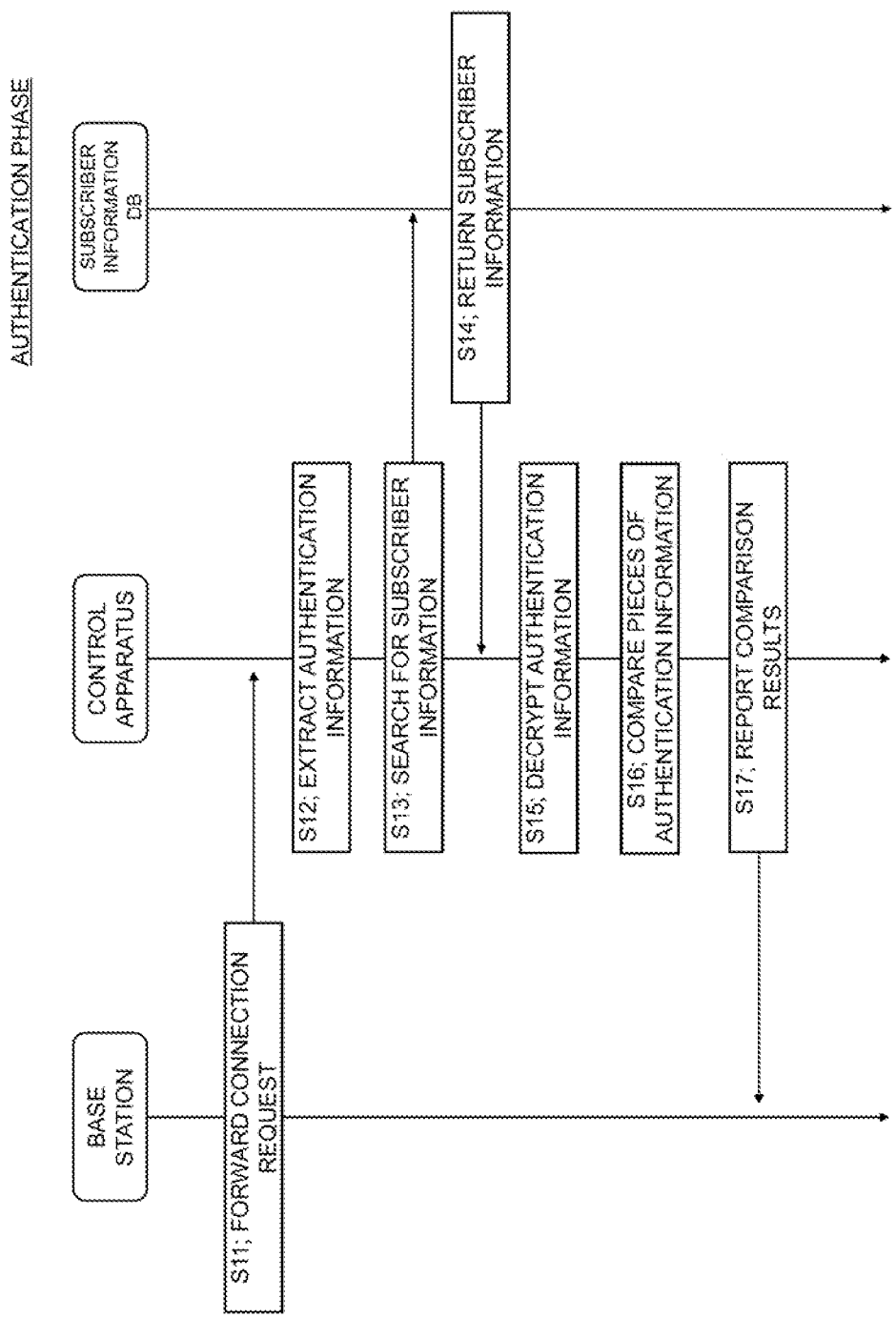
FIG. 11 is a sequence diagram illustrating an example of operation related to authentication phase of the radio communication system according to the first example embodiment.

FIG. 11 is a sequence diagram illustrating an example of operation related to the authentication phase of the radio communication system according to the first example embodiment.

The base station 10 forwards the connection request from the terminal apparatus 20 to the control apparatus 30 (Step S11). The control apparatus 30 extracts the authentication information from the acquired connection request (Step S12). The control apparatus 30 searches for the subscriber information database 60 by using the IMSI or the like of the authentication information as a search key (Step S13).

When there is a matching entry, the subscriber information database 60 returns subscriber information as a search result (Step S14).

The control apparatus 30 decrypts the encrypted authentication information (Step S15).

The control apparatus 30 performs comparison processing of the authentication information extracted in Step S12 (authentication information described in a SIM card) and the authentication information decrypted in Step S15 (authentication information registered in the subscriber information database 60) (Step S16).

The control apparatus 30 determines whether the connection request of the terminal apparatus 20 can be accepted or not according to a result of the comparison, and reports its determination result to the terminal apparatus 20 via the base station 10 (Step S17).

As described above, in the radio communication system according to the first example embodiment, the control apparatus 30 registers the subscriber information including the encrypted authentication information in the subscriber information database 60. When authentication of the terminal apparatus 20 is needed, the control apparatus 30 acquires the subscriber information from the subscriber information database 60, releases the encryption, and extracts the authentication information. The control apparatus 30 compares the authentication information acquired from the terminal apparatus 20 and the authentication information acquired from the subscriber information database 60, to perform subscriber authentication. The authentication information being encrypted is stored in the subscriber information database 60, and thus even if a network node is set up in the premises or a facility of a network operator such as private LTE, the authentication information is appropriately protected. In other words, even if an attacker accesses the subscriber information database 60 without authorization and the authentication information leaks, the authentication information is by no means known to a third party because the authentication information is encrypted.

Second Example Embodiment

Next, a second example embodiment will be described in detail with reference to the drawings.

The first example embodiment presupposes a configuration that the SIM provider that provides the subscriber information appropriately encrypts the authentication information. However, there may be a case in which the SIM provider fails to perform the encryption, a case in which information from the SIM provider with no agreement to encrypt the authentication information is accepted, and the like.

The second example embodiment will provide description of a case in which, in consideration of the cases as described above, whether or not the authentication information acquired from the SIM provider is encrypted is checked, and if the information is not encrypted, an apparatus encrypts the authentication information.

Note that, in the second example embodiment, the system configuration and the internal configuration of the control apparatus 30 can be the same as the system configuration and the like described in the first example embodiment. Thus, detailed description of the system configuration and the like according to the second example embodiment will be omitted.

When the registration section 203 acquires subscriber information from the SIM provider, the registration section 203 determines whether or not at least authentication information among the subscriber information is encrypted.

Here, in the second example embodiment, there is predetermined agreement concerning generation of the authentication information between the SIM provider and the core network 12 (control apparatus 30). Specifically, the SIM provider includes a check code in the subscriber information. For example, the SIM provider generates hash values of an IMSI, the authentication information (for example, OPc) encrypted with a public key and the authentication information (OPc) before being encrypted as the check code.

The control apparatus 30 determines whether or not the authentication information is encrypted by using the check code. Specifically, the registration section 203 attempts to decrypt the acquired authentication information with a private key. Subsequently, the registration section 203 attempts to generate a code similar to the check code generated by the SIM provider. Specifically, the registration section 203 calculates hash values of the IMSI obtained from the subscriber information, the authentication information obtained from the subscriber information (encrypted authentication information), and authentication information decrypted with the private key (corresponding to the authentication information before being encrypted). When the check code (hash values) acquired from the SIM provider and the hash values calculated by the registration section 203 match, the registration section 203 determines that the authentication information is encrypted. In contrast, when these hash values do not match, the registration section 203 determines that the acquired authentication information is not encrypted.

Alternatively, the registration section 203 may determine whether the SIM provider is a SIM provider that supports or that does not support encryption of the authentication information by using a part of the subscriber information (for example, an IIN) acquired from the SIM provider. Specifically, a list of SIM providers that encrypt the authentication information and/or a list of SIM providers that do not encrypt the authentication information may be stored in the control apparatus 30 in advance, and the registration section 203 may determine whether or not the authentication information is in ciphertext or in plaintext by referring to the list(s).

When the authentication information is encrypted, the registration section 203 registers the acquired subscriber information in the subscriber information database 60 as it is, similarly to the first example embodiment.

In contrast, when the authentication information is not encrypted, the registration section 203 encrypts the authentication information as necessary, and then registers the subscriber information in the subscriber information database 60. For example, the registration section 203 encrypts the authentication information by using a public key that is distributed to the SIM provider.

By using the public key that has been distributed to the SIM provider, the authentication section 204 can handle the authentication information that is initially encrypted and the authentication information that is encrypted in its apparatus (control apparatus 30) without distinguishing those pieces of authentication information. In other words, the authentication section 204 can decrypt the two pieces of encrypted authentication information by using the same private key.

Alternatively, the key generation section 202 may generate a dedicated key (for example, a common key) for encrypting non-encrypted authentication information. The registration section 203 encrypts the authentication information by using the common key, and registers the encrypted authentication information in the subscriber information database 60. In this case, the authentication section 204 decrypts the encrypted authentication information by using the common key.

Figure 12:
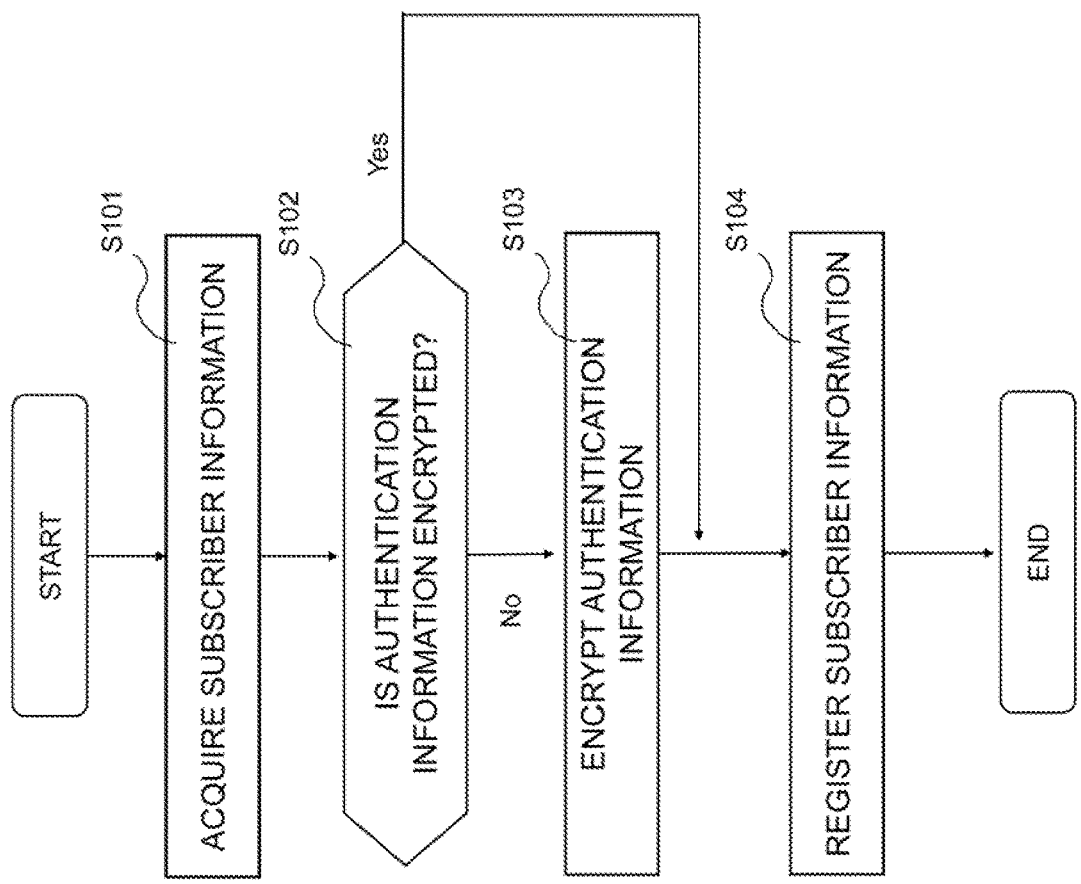
FIG. 12 is a flowchart illustrating an example of operation of the control apparatus according to a second example embodiment.

The outline of the operation of the control apparatus 30 according to the second example embodiment is as illustrated in the flowchart illustrated in FIG. 12.

The control apparatus 30 acquires the subscriber information from the SIM provider (Step S101). The control apparatus 30 determines whether or not the authentication information is encrypted (Step S102).

When the authentication information is encrypted (Yes branch in Step S102), the control apparatus 30 executes the processing of Step S104.

When the authentication information is not encrypted (No branch in Step S102), the control apparatus 30 encrypts the authentication information (Step S103).

The control apparatus 30 registers the subscriber information in which the authentication information is encrypted in the subscriber information database 60 (Step S104).

As described above, the control apparatus 30 according to the second example embodiment determines whether or not the authentication information acquired from the SIM provider is appropriately encrypted. When the authentication information is not encrypted as a result of the determination, the control apparatus 30 encrypts the authentication information, and then registers the encrypted authentication information in the subscriber information database 60. As a result, even if the SIM provider does not perform encryption of the authentication information, the authentication information is appropriately protected.

Third Example Embodiment

Next, a third example embodiment will be described in detail with reference to the drawings.

The first and second example embodiments describe a case in which the authentication information encrypted by the SIM provider is registered in the subscriber information database 60 as it is. Here, the disclosure of the present application presupposes a configuration that the public key that the SIM provider uses for encryption of the authentication information is prepared for each network operator (end user).

There is a massive number of network operators with which the SIM provider carries out transactions, and thus supplying products with different public keys being prepared for each network operator imposes a great management burden of keys on the SIM provider. With a method in which the public key is determined for each network operator and decryption is performed with a corresponding private key, the SIM provider needs to prepare different keys (public keys) for each of the plurality of network operators to supply products. The number of SIM providers, by contrast, is limited, and thus even if different keys (public key, private key) are prepared for each of the SIM providers, management of the keys does not impose a great burden.

Accordingly, it is realistic to prepare the public key for each SIM provider, instead of the configuration that the public key that the SIM provider uses for encryption of the authentication information is prepared for each network operator as with the case of the presupposition described above, for example.

However, the configuration as described above leaves room for the network operator to acquire authentication information related to other network operators without authorization. For example, with reference to FIG. 13, the same private key is stored in the control apparatuses 30 supplied for each of a network operator A and a network operator B. In this case, for example, the network operator A may access the subscriber information database 60 of the network operator B and acquire authentication information stored in the database without authorization.

In other words, if the private keys in the apparatuses supplied for respective network operators are the same as each other, using the private key of the product supplied for a certain company allows for acquisition of the authentication information from a system constructed for another company. In this manner, the same public key is used in encryption of the authentication information in the network operators adopting the same EPC (core network node including the control apparatus 30), which causes concerns in terms of security.

Figure 13:
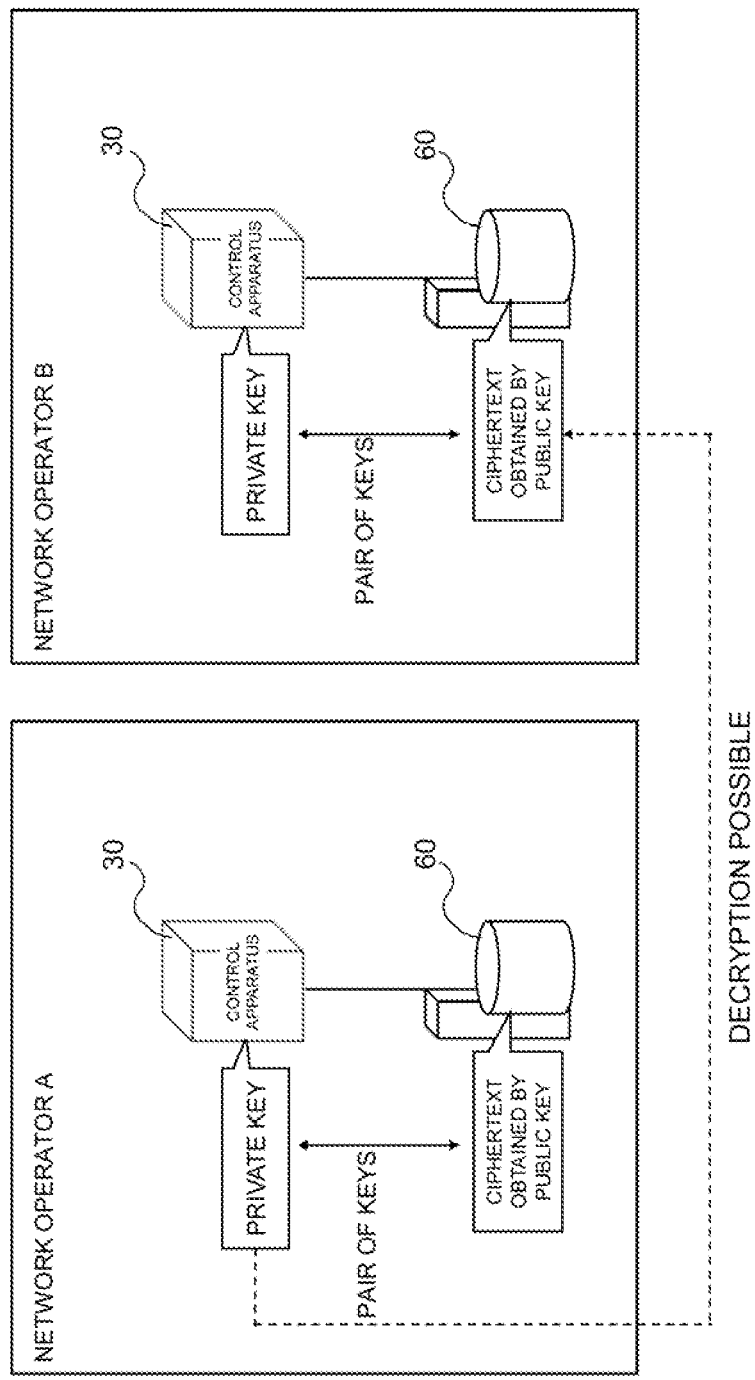
FIG. 13 is a diagram for illustrating a problem to be solved in a third example embodiment.

Alternatively, in FIG. 13, if the private key managed by the network operator A leaks to the outside, the authentication information registered in the subscriber information database 60 of the other network operator B is also exposed to the possibility of leakage of information.

In the third example embodiment, a countermeasure for solving the inconvenience as described above will be described. In the third example embodiment, when the subscriber information is registered in the subscriber information database 60, the authentication information is encrypted through processing that is different from the encryption processing performed by the SIM provider.

More specifically, in the third example embodiment, when the control apparatus 30 acquires encrypted authentication information, the control apparatus 30 brings the authentication information back to plaintext (decrypts encryption). Subsequently, the control apparatus 30 re-encrypts the authentication information, based on information specific to the network operator, and registers the re-encrypted authentication information in the subscriber information database 60.

In the example of FIG. 13, the control apparatus 30 according to the third example embodiment encrypts the authentication information of the terminal apparatus 20 belonging to the network operator A, based on individual information of the network operator A. The control apparatus 30 encrypts the authentication information of the terminal apparatus 20 belonging to the network operator B, based on individual information of the network operator B.

As a result of the operation as described above, the authentication information stored in the subscriber information database 60 of the network operator B cannot be decrypted with the private key that the network operator A can acquire. Alternatively, even if the private key of the network operator A is known to a third party, the authentication information that cannot be decrypted with the private key is stored in the subscriber information database 60, and thus the authentication information of the network operators A and B is by no means known to the third party.

Note that, in the third example embodiment, the system configuration and the internal configuration of the control apparatus 30 can be the same as the system configuration and the like described in the first example embodiment. Thus, detailed description of the system configuration and the like according to the third example embodiment will be omitted.

Next, operation of the control apparatus 30 according to the third example embodiment will be described with reference to the drawings.

Figure 14:
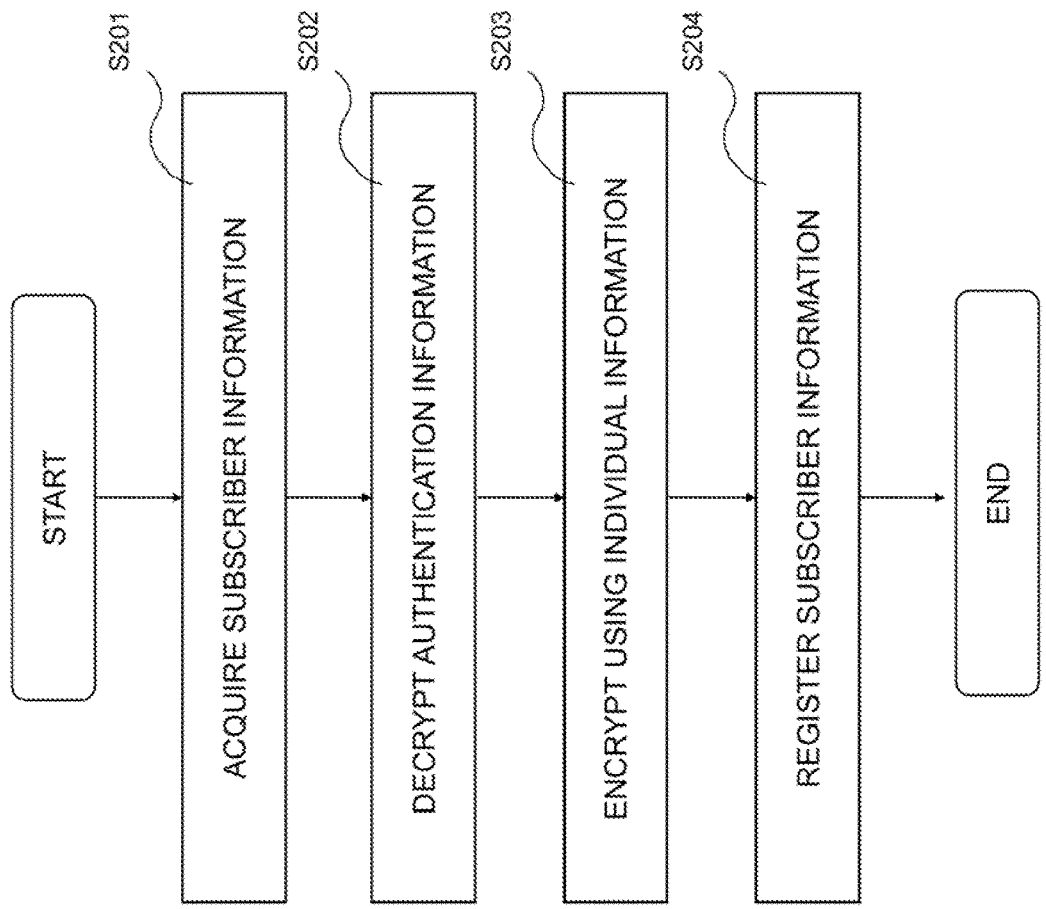
FIG. 14 is a flowchart illustrating an example of registration operation of the control apparatus according to the third example embodiment.

FIG. 14 is a flowchart illustrating an example of registration operation of the control apparatus 30 according to the third example embodiment.

The registration section 203 acquires from the SIM provider the subscriber information in which the authentication information is encrypted (Step S201).

The registration section 203 decrypts the authentication information (Step S202). Specifically, the registration section 203 decrypts the authentication information by using a private key corresponding to a public key that is distributed to the SIM provider. In this case, the registration section 203 takes into account that the authentication information is in a state of plaintext even for a short period of time, and stores the authentication information in plaintext being decrypted results in a memory, and arranges not to perform copy of the authentication information in plaintext and generation of a log including the authentication information.

Next, the registration section 203 encrypts the authentication information by using individual information for the network operator (Step S203). Examples of the individual information for the network operator include an address and a telephone number of the network operator and the like. Note that the individual information of the network operator may be input to the control apparatus 30 in advance at the time of shipping, or a GUI for inputting the individual information may be provided for the network operator.

The registration section 203 delivers the individual information of the network operator to the key generation section 202, and gives a command to the key generation section 202 to generate a common key.

The key generation section 202 that has received the command inputs the individual information of the network operator to a hash function, and obtains a hash value. Note that the hash function used by the key generation section 202 may be any function as long as a hash value can be obtained. Examples thereof include hash functions that can use algorithm such as Message Digest Algorithm 5 (MD5) and Secure Hash Algorithm (SHA).

The key generation section 202 generates the common key by using the hash value that is generated from the individual information of the network operator as a "seed". The key generation section 202 delivers the generated common key to the registration section 203.

The registration section 203 encrypts the authentication information by using the common key. Subsequently, the registration section 203 registers the subscriber information including the encrypted authentication information in the subscriber information database 60 (Step S204).

Note that the "seed" used for generation of the common key changes according to the individual information of the network operator due to collision resistance of the hash value (property that different hash values are calculated when different pieces of input data are used). When the seeds are different for respective network operators, the common keys used for encryption are also different for respective network operators.

As a result, the authentication information of the network operator A and the authentication information of the network operator B are encrypted by using common keys different from each other, and are then registered in the subscriber information database 60.

In this manner, the registration section 203 according to the third example embodiment decrypts the authentication information in ciphertext included in the subscriber information acquired via the communication control section 201, and extracts the authentication information in plaintext. Subsequently, the registration section 203 encrypts the authentication information in plaintext, based on the individual information of the operator of the core network, and registers the encrypted authentication information in the subscriber information database 60. In other words, the control apparatus 30 according to the third example embodiment registers the authentication information in ciphertext generated based on the individual information of the network operator in the subscriber information database 60, instead of the authentication information in ciphertext from the SIM provider.

It is only necessary that the authentication section 204 according to the third example embodiment decrypt the encrypted authentication information by using a common key corresponding to each network operator (common key generated by the key generation section 202) in Step S15 illustrated in FIG. 11.

Figure 15:
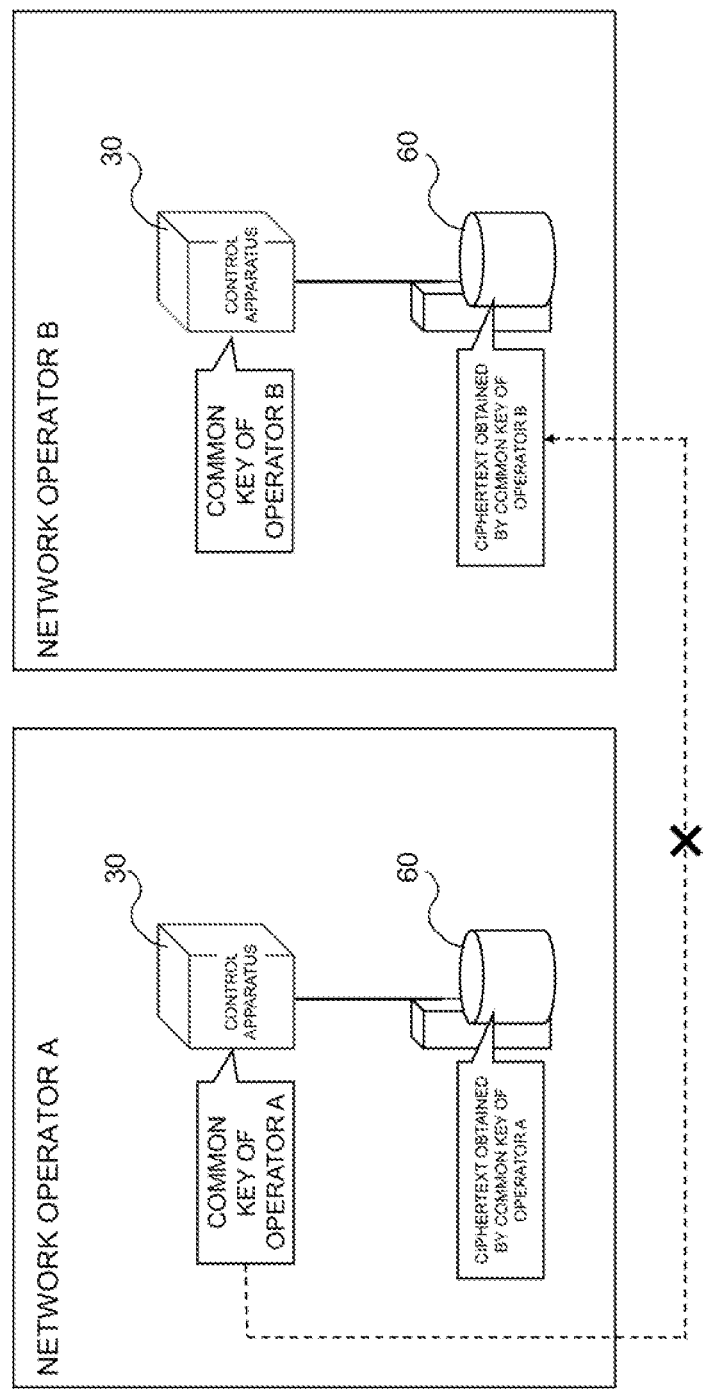
FIG. 15 is a diagram for illustrating effects of the third example embodiment.

As described above, in the third example embodiment, the control apparatus 30 breaks the encryption of the authentication information provided from the SIM provider, and subsequently, encrypts the authentication information, based on the individual information of the network operator again. As a result, even if the private key used for decryption of the authentication information leaks to a third party, or the network operator attempts to use the private key without authorization, the authentication information is appropriately protected. This is because the subscriber information actually registered in the subscriber information database 60 is encrypted with a key (key generated based on the individual information of the network operator) that is different from the leaked private key, and decryption is thus failed with the leaked private key or common keys stored by other network operators (see FIG. 15).

By configuring the common key for each network operator as in the case of the third example embodiment, implementation of redundancy of the network node such as the control apparatus 30 and replacement of apparatuses (pieces of hardware) can be performed easily. In implementation of redundancy and replacement of apparatuses as above, a plurality of apparatuses (control apparatuses 30) that perform the same operation need to be prepared. Thus, the key for encrypting and the key for decrypting the authentication information need to be the same between the plurality of apparatuses as well. In the third example embodiment, the same key is generated as long as the individual information of the network operator is uniquely determined, and thus implementation of redundancy and the like as above can be easily carried out.

Note that the third example embodiment derives from such concerns that management of public keys for each network operator in the SIM provider imposes a great management burden of keys in the SIM provider. However, by sending the public key from the network operator to the SIM provider every time SIM information is needed, the key management burden in the SIM provider may be reduced. In this case, a pair of a public key and a private key may be generated in the control apparatus 30 every time there is a request and the public key may be delivered to the SIM provider so as to be used for encryption, or an encryption key of a pair of a public key and a private key generated in the control apparatus 30 in advance may be used a plurality of times.

Fourth Example Embodiment

Next, a fourth example embodiment will be described in detail with reference to the drawings.

Figure 16:
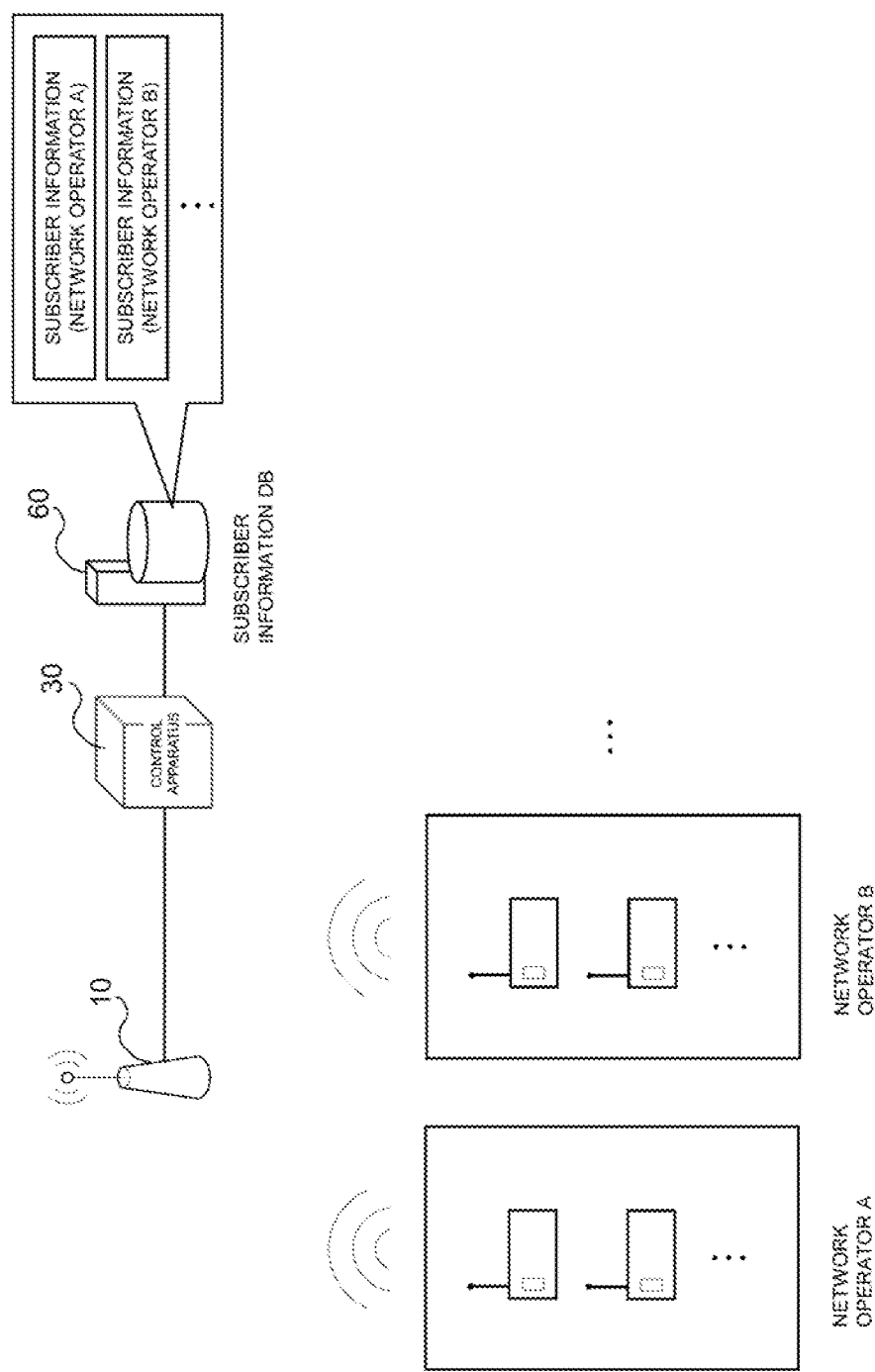
FIG. 16 is a diagram for illustrating that a network is shared by network operators according to a fourth example embodiment.

The first to third example embodiments presuppose a case in which one radio communication system is dedicated for one network operator. However, the base station 10 and nodes in the core network 12 may be shared by a plurality of network operators. For example, as illustrated in FIG. 16, the core network node and the like may be shared by a plurality of network operators.

For example, when the network operator A and the network operator B are different organizations (different companies) but are tenants in the same building, the core network (EPC) may be shared. Alternatively, when the network operator A and the network operator B are different departments of the same company (for example, an accounting department and an engineering department), their respective terminal apparatuses 20 may be managed separately but share the core network node and the like.

In a case as described above, in the subscriber information database 60, pieces of subscriber information of the terminal apparatuses 20 belonging to the network operator A and the network operator B coexist. In this manner, even when the network apparatus is shared by different network operators, pieces of subscriber information related to respective network operators are required to be appropriately protected.

The fourth example embodiment will describe protection of the subscriber information when the network is shared by different network operators.

Note that, in the fourth example embodiment, the system configuration and the internal configuration of the control apparatus 30 can be the same as the system configuration and the like described in the first example embodiment. Thus, detailed description of the system configuration and the like according to the fourth example embodiment will be omitted.

Figure 17:
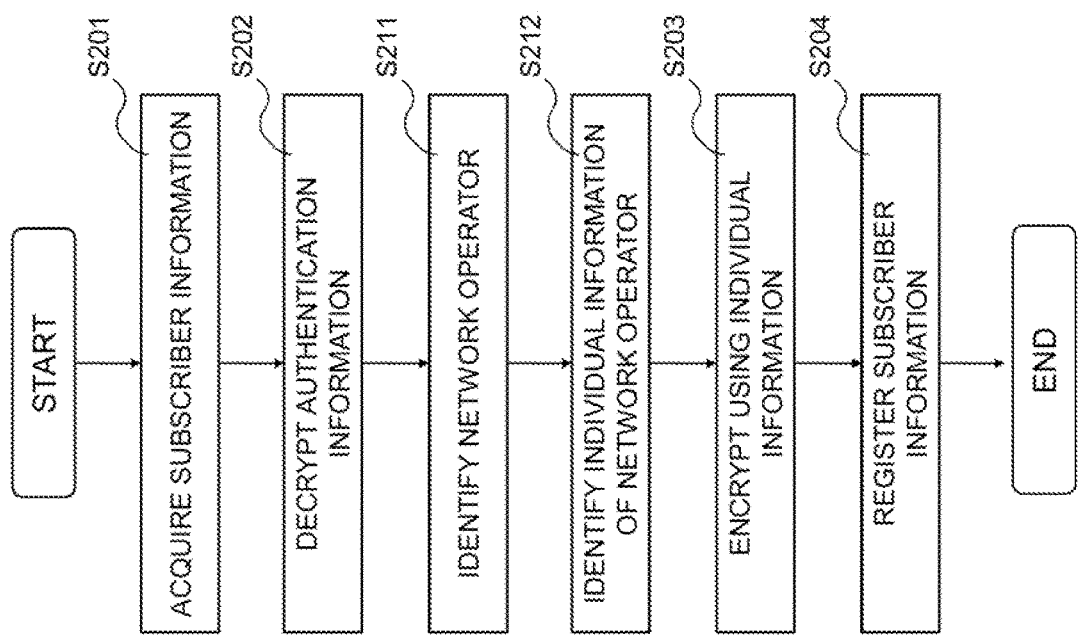
FIG. 17 is a flowchart illustrating an example of registration operation of the control apparatus according to the fourth example embodiment.

FIG. 17 is a flowchart illustrating an example of registration operation of the control apparatus 30 according to the fourth example embodiment. In FIG. 17, processing that is the same as the processing illustrated in FIG. 14 is denoted by the same reference sign (step), and description thereof will be omitted.

The difference between FIG. 17 and FIG. 14 lies in that processing of Steps S211 and S212 is added in FIG. 17.

In Step S211, the registration section 203 identifies the network operator to which the acquired subscriber information belongs. In this case, the registration section 203 identifies the network operator of the acquired subscriber information with reference to an IMSI of the subscriber information.

For example, the administrator of the system or the like registers information in which IMSIs and network operators are associated with each other in the subscriber information database 60 in advance (see FIG. 18). The registration section 203 refers to the information, and identifies the network operator corresponding to the acquired subscriber information, based on the acquired IMSI.

In Step S212, the registration section 203 identifies corresponding individual information from the identified network operator. The administrator of the system or the like registers information in which network operators and pieces of individual information are associated with each other in the control apparatus 30 in advance (see FIG. 19). The registration section 203 refers to the information, and acquires the individual information used for generation of a common key.

When the registration section 203 generates a common key of each network operator, the registration section 203 manages the network operator and the generated common key by associating the network operator and the generated common with each other (see FIG. 20). The associated information is referred to at the time of authentication operation performed by the authentication section 204. In other words, the authentication section 204 refers to the information (information in which network operators and their corresponding common keys are associated with each other) that is generated by the registration section 203, and identifies the common key necessary for decryption of the authentication information at the time of authentication.

Note that the information (FIG. 19) in which network operators and pieces of individual information are associated with each other is stored in an external server or the like, and the control apparatus 30 may access the external server as appropriate and acquire the information.

Note that, as described above, whether or not the authentication information is encrypted can be determined with reference to the SIM provider ID. Thus, the authentication section 204 may determine whether the acquired authentication information is in plaintext or is in ciphertext with reference to the SIM provider ID, and when the authentication information is in ciphertext, the authentication section 204 may identify a necessary decryption key from the list.

Alternatively, a customer ID being a network operator identifier acquired from the control apparatus 30 may be included in the subscriber information. In a case in which the customer ID is included in the subscriber information, the control apparatus 30 can identify the network operator to which the subscriber information belongs by referring to the information.

As described above, even when the core network node and the like are shared by a plurality of network operators, the subscriber information of each network operator can be appropriately protected by using the individual information of the network operator. For example, if access to the information illustrated in FIG. 20 in which network operators and common keys are associated with each other is appropriately restricted, the network can be shared between a plurality of network operators without having the common key known to other network operators. Note that the restriction of access to the information can be implemented through authentication using a password for each network operator or the like.

Fifth Example Embodiment

Next, a fifth example embodiment will be described in detail with reference to the drawings.

In the third and fourth example embodiments, the control apparatus 30 brings the authentication information to plaintext once, and then performs encryption processing again. Thus, in a state in which the authentication information is brought back to plaintext and when the common key for each network operator leaks, there are minor concerns about leakage of the authentication information.

In view of this, in order to eliminate such minor concerns, the fifth example embodiment will describe a case in which decryption of the authentication information is not performed at the time of subscriber information registration.

Note that, in the fifth example embodiment, the system configuration and the internal configuration of the control apparatus 30 can be the same as the system configuration and the like described in the first example embodiment. Thus, detailed description of the system configuration and the like according to the fifth example embodiment will be omitted.

Figure 21:
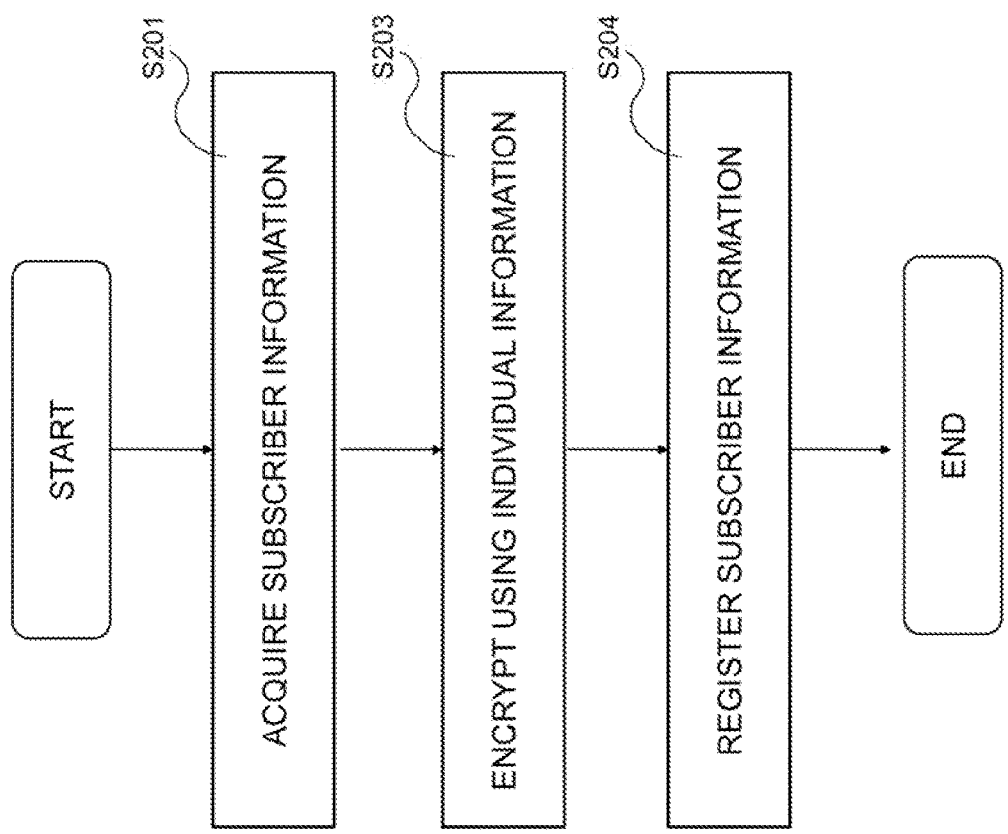
FIG. 21 is a flowchart illustrating an example of registration operation of the control apparatus according to a fifth example embodiment.

FIG. 21 is a flowchart illustrating an example of registration operation of the control apparatus 30 according to the fifth example embodiment. In FIG. 21, processing that is the same as that of the flowchart illustrated in FIG. 14 is denoted by the same reference sign (step).

The difference between FIG. 21 and FIG. 14 lies in that there is no decryption processing of the authentication information of Step S202 in the fifth example embodiment. In other words, the registration section 203 further encrypts the authentication information acquired from the SIM provider (authentication information encrypted with a public key) by using a common key generated from the individual information of the network operator.

Through such two-step encryption as above (double encryption, or multiple encryption), the authentication information is further securely protected. In other words, in order for a third party to obtain plaintext from encrypted authentication information registered in the subscriber information database 60, the third party needs to decrypt the encrypted authentication information by using a common key different for each network operator, and further decrypt the encrypted authentication information by using a private key corresponding to a public key distributed to the SIM provider. In other words, the authentication information is protected unless these two keys (common key, private key) are leaked.

Note that, for extraction of the authentication information using the two keys, the authentication section 204 also needs to perform similar operation. Specifically, it is only necessary that the authentication section 204 according to the fifth example embodiment acquire the authentication information by using a common key corresponding to each network operator in Step S15 illustrated in FIG. 11 and a private key corresponding to the public key distributed to the SIM provider. In other words, the decryption processing according to the fifth example embodiment is a scheme that has a large processing load and is thus inadequate for regular use. Thus, the scheme according to the fifth example embodiment may be applied only to subscriber information and authentication information to be especially protected.

As described above, by further encrypting encrypted authentication information with information based on the individual information of the network operator, security of the authentication information can further be enhanced.

Figure 22:
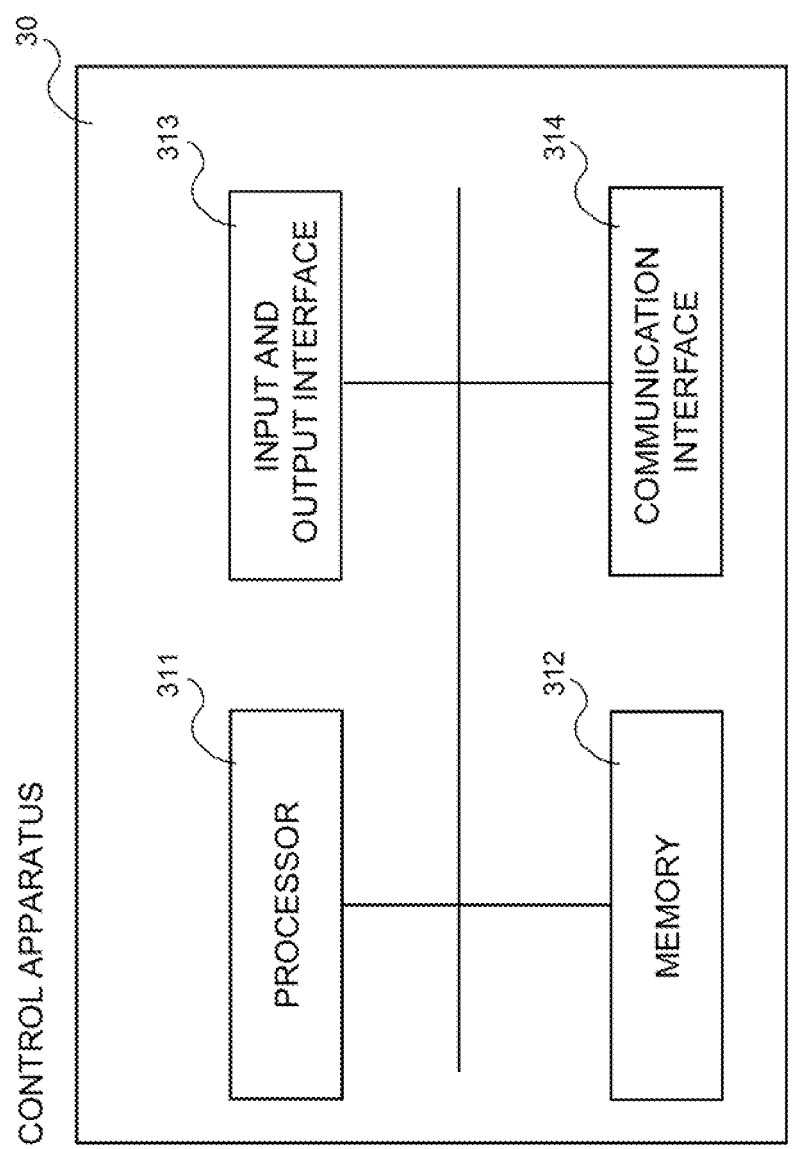
FIG. 22 is a diagram illustrating an example of a hardware configuration of the control apparatus.

Next, hardware of each apparatus constituting the radio communication system will be described. FIG. 22 is a diagram illustrating an example of a hardware configuration of the control apparatus 30.

The control apparatus 30 can be configured with an information processing apparatus (so-called a computer), and includes a configuration illustrated in FIG. 22. For example, the control apparatus 30 includes a processor 311, a memory 312, an input and output interface 313, a communication interface 314, and the like. Constituent elements of the processor 311 and the like are connected with each other via an internal bus or the like, and are configured to be capable of communication with each other.

Note that the configuration illustrated in FIG. 22 is not to limit the hardware configuration of the control apparatus 30. The control apparatus 30 may include hardware (not illustrated), or need not include the input and output interface 313 as necessary. The number of processors 311 and the like included in the control apparatus 30 is not to be limited to the example illustrated in FIG. 22, and for example, a plurality of processors 311 may be included in the control apparatus 30.

The processor 311 is, for example, a Central Processing Unit (CPU), a Micro Processing Unit (MPU), and a programmable device such as a Digital Signal Processor (DSP). Alternatively, the processor 311 may be a device such as a Field Programmable Gate Array (FPGA) and an Application Specific Integrated Circuit (ASIC). The processor 311 executes various programs including the Operating System (OS).

The memory 312 is a Random Access Memory (RAM), a Read Only Memory (ROM), a Hard Disk Drive (HDD), a Solid State Drive (SSD), or the like. The memory 312 stores an OS program, application programs, and various pieces of data.

The input and output interface 313 is an interface of a display apparatus and an input apparatus (not illustrated). The display apparatus is, for example, a liquid crystal display or the like. The input apparatus is, for example, an apparatus that receives user operation, and may include a keyboard, a mouse, or the like.

The communication interface 314 is a circuit, a module, or the like that performs communication with another apparatus. For example, the communication interface 314 includes a Network Interface Card (NIC) or the like.

The function of the control apparatus 30 is implemented by various processing modules. The processing module is, for example, implemented by the processor 311 executing a program stored in the memory 312. The program can be recorded in a computer-readable storage medium. The storage medium can be a non-transient (non-transitory) storage medium, such as a semiconductor memory, a hard disk, a magnetic recording medium, and an optical recording medium. In other words, the present invention can be implemented as a computer program product. The program can be updated by downloading via a network, or by using a storage medium storing a program. In addition, the processing module may be implemented by a semiconductor chip.

Note that the relaying apparatus 40, the gateway apparatus 50, and the like can also be configured by an information processing apparatus similarly to the control apparatus 30, and its basic hardware configuration has no difference from that of the control apparatus 30, and thus description thereof will be omitted.

Example Alterations

The configuration, the operation, and the like of the radio communication system described in the example embodiments are merely examples, and are not to limit the configuration and the operation of the system. For example, any one of a registration means (registration section 203) for the subscriber information and a means (authentication section 204) for the subscriber authentication included in the control apparatus 30 may be implemented by an apparatus different from the control apparatus 30. For example, an apparatus different from the control apparatus 30 may acquire the subscriber information in which the authentication information is encrypted, and register the encrypted subscriber information in the subscriber information database 60. Alternatively, an apparatus different from the control apparatus 30 may access the subscriber information database 60, perform authentication of the terminal apparatus 20, and report the result to the control apparatus 30. Specifically, the registration means and the authentication means may be included in a communication network (for example, private LTE). Note that, when the authentication means and the like are implemented in the apparatus different from the control apparatus 30, exchange of information between apparatuses becomes frequent, increasing the possibility (risk) of information leak. Accordingly, from the perspective of security, it is desirable that the registration means and the authentication means be included in one apparatus (for example, the MME) as described in the example embodiments.

Figure 23:
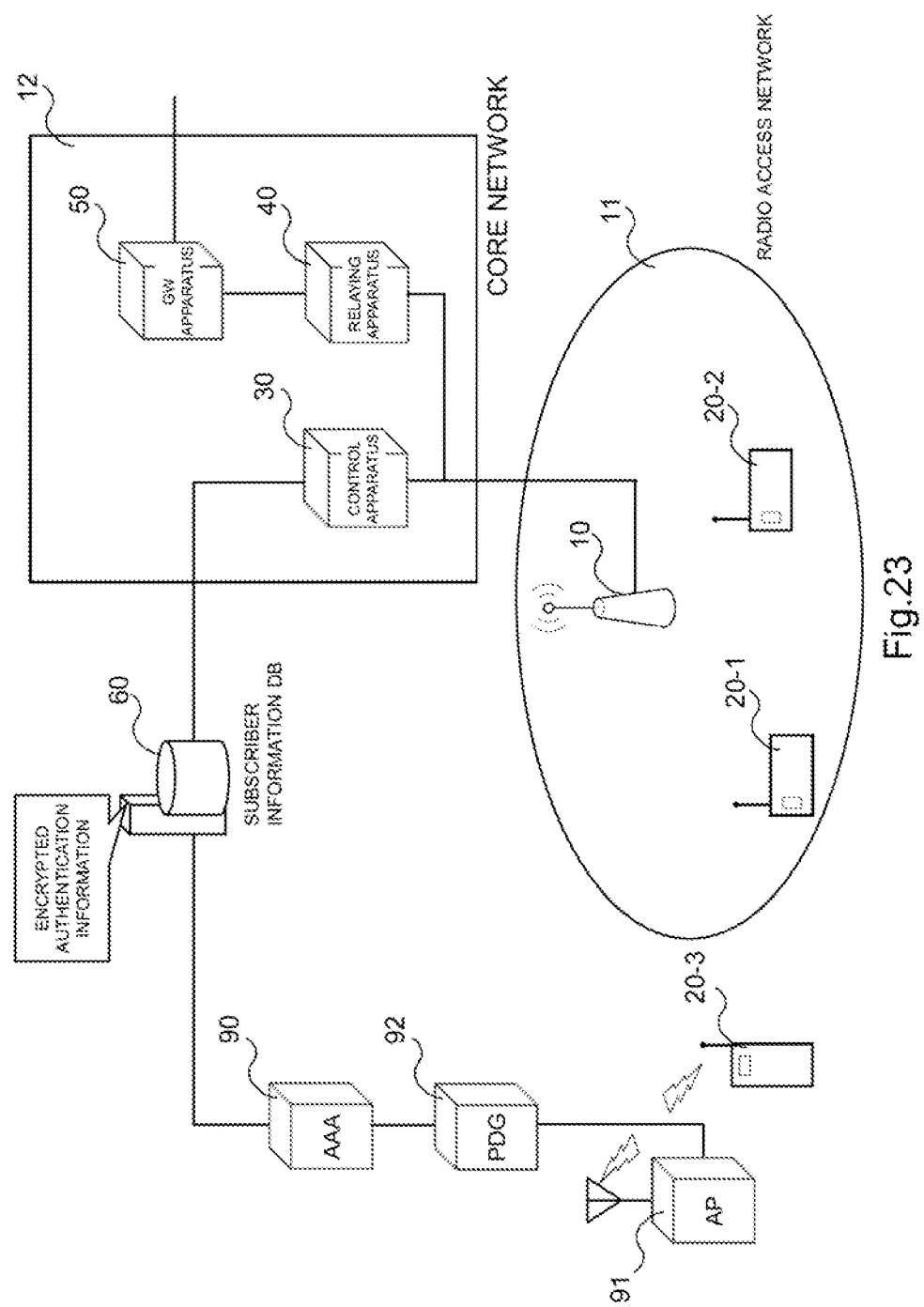
FIG. 23 is a diagram illustrating an example of a schematic configuration of the radio communication system according to an example alteration.

The example embodiments describe a case in which the control apparatus 30 accesses the subscriber information database 60. However, another entity (apparatus) may access the subscriber information database 60, and use its internal information. For example, authentication necessary at the time of Wireless Fidelity (Wi-Fi) connection may be executed by using the authentication information registered in the subscriber information database 60. In this case, as illustrated in FIG. 23, an Authentication, Authorization and Accounting (AAA) server 90 is connected to the subscriber information database 60. Authentication information of a terminal apparatus 20-3 having a wireless Local Area Network (LAN) access function is transmitted to the AAA server 90 via an Access Point (AP) 91 and a Packet Data Gateway (PDG) 92. In other words, as illustrated in FIG. 23, the subscriber information (authentication information) stored in the subscriber information database 60 may be shared with an apparatus other than the control apparatus 30.

The example embodiments describe a case in which the SIM provider encrypts the authentication information. However, the SIM provider may also encrypt other information included in the subscriber information. Specifically, it is only necessary that the control apparatus 30 register entirely or partially encrypted subscriber information in the subscriber information database 60.

The example embodiments describe a case in which the control apparatus 30 generates a public key distributed to the SIM provider. However, the public key and a corresponding private key may be generated in an apparatus other than the control apparatus 30. For example, the system administrator may generate the two keys, register the private key in the control apparatus 30, and distribute the public key to the SIM provider. Specifically, the key generation section 202 need not be included in the control apparatus 30.

The example embodiments describe a case in which the database management section 205 is included in the control apparatus 30. However, the management section need not be included in the control apparatus 30. Specifically, the function of the database management section 205 may be implemented by another apparatus. The control apparatus 30 need not include a part or all of the database management section 205 described above.

The example embodiments describe a case in which different public keys are generated when the SIM providers are different. In addition to such a configuration, the public key provided for the SIM provider may be generated so as to be different when each of the SIM provider and the network operator is different. For example, the public key can be generated by using information combining the individual information of the SIM provider and the individual information of the network operator as a "seed" of key generation.

The example embodiments describe a case in which the common key is generated for each network operator by using the individual information of the network operator. However, the common key may be generated by using the individual information of the terminal apparatus 20. Specifically, by changing the common key used at the time of encrypting the authentication information for each terminal apparatus, resistance of the key to information leak can be enhanced. Note that an IMSI or the like described in the subscriber information can be used as the individual information of the terminal apparatus 20.

The example embodiments describe a case in which the individual information of the network operator is input from the outside in advance or is acquired from the outside. However, the control apparatus 30 may generate the individual information of the network operator. For example, the time when the control apparatus 30 is initially started or the like may be used as the "individual information of the network operator". Alternatively, the control apparatus 30 may use a hash value of the "customer ID" as the individual information of the network operator. Specifically, the individual information of the network operator according to the disclosure of the present application may be any type of information as long as the information is information having contents different for each network operator.

In the example embodiments, a key (public key, common key) is used for encryption of the authentication information. However, this is not to limit the scheme of encryption. In the disclosure of the present application, any encryption scheme may be used as long as the encryption scheme allows the authentication information to be converted from the original state, and also allows the original authentication information to be derived from the converted authentication information. For example, the conversion of the authentication information may be used through logical operation using the authentication information and the individual information of the network operator (for example, calculation of the exclusive OR of the both). Specifically, for encryption in the disclosure of the present application, any encryption scheme or conversion scheme may be used as long as the scheme includes conversion of information and has reversibility. Note that the type of encryption scheme may be selected in consideration of a processing load required in encryption processing and security strength.

The SIM provider may provide a digital signature for generated subscriber information. In this case, when the control apparatus, being a receiver of the subscriber information, successfully confirms validity of the digital signature, the control apparatus registers the subscriber information in the subscriber information database 60.

A possible example of the control apparatus 30 described in the example embodiments is a calculator (information processing apparatus) including a processor, a memory, and the like. Alternatively, the control apparatus 30 may be a virtual machine that emulates a plurality of computers in one computer. Specifically, the control apparatus 30 may be a calculator (physical machine) such as a server, or may be a virtual machine.

The core network 12 may be physically configured with a plurality of apparatuses (nodes), or may be physically configured with one apparatus. For example, in the latter case, a communication network function may be virtualized, and the core network 12 may be constructed by using Network Functions Virtualization (NFV) that implements the function with a general server.

In a plurality of flowcharts referred to in the description above, a plurality of steps (processing) are described in order. However, the execution order of the steps executed in each example embodiment is not limited to the described order. In each example embodiment, the order of the illustrated steps can be changed as far as there is no problem with regard to its contents, such as in a manner of executing respective pieces of processing in parallel, for example. Respective example embodiments described above can be combined with each other as far as the contents remain consistent.

The whole or part of the example embodiments disclosed above can be described as in the following supplementary notes, but are not limited to the following.

(Supplementary Note 1)

A control apparatus including:

an acquisition means (101, 201) for acquiring subscriber information in which at least authentication information is encrypted; and a registration means (102, 203) for registering the acquired subscriber information in a database (60) included in a core network (12).

(Supplementary Note 2)

The control apparatus according to supplementary note 1, further including an authentication means (204) for decrypting the encrypted authentication information, and using the decrypted authentication information and authentication information included in a connection request from a terminal apparatus (20) to the core network (12) to authenticate the terminal apparatus (20).

(Supplementary Note 3)

The control apparatus according to supplementary note 2, wherein the authentication information is encrypted using a public key by an external apparatus (70), and the authentication means (204) decrypts the encrypted authentication information using a private key corresponding to the public key.

(Supplementary Note 4)

The control apparatus according to any one of supplementary notes 1 to 3, wherein when the authentication information included in the subscriber information is not encrypted, the registration means (102, 203) encrypts the authentication information, and registers the subscriber information including the encrypted authentication information in the database (60) thereafter.

(Supplementary Note 5)

The control apparatus according to any one of supplementary notes 1 to 4, wherein
the registration means (102, 203) decrypts the authentication information in ciphertext included in the subscriber information acquired by the acquisition means (101, 201) to extract the authentication information in plaintext, encrypts the authentication information in plaintext based on individual information of an operator of the core network (12), and registers the encrypted authentication information in the database (60).

(Supplementary Note 6)

The control apparatus according to supplementary note 5, further including
a key generation means (202) for using the individual information of the operator of the core network (12) to generate a common key for encrypting the authentication information in plaintext.

(Supplementary Note 7)

The control apparatus according to any one of supplementary notes 1 to 4, wherein
the registration means (102, 203) encrypts the encrypted authentication information included in the subscriber information based on individual information of an operator of the core network (12), and registers the encrypted authentication information in the database (60).

(Supplementary Note 8)

The control apparatus according to any one of supplementary notes 1 to 7, further including
a database management means (205) for managing the database (60), wherein
the database management means (205) controls import and export of data stored in the database (60).

(Supplementary Note 9)

The control apparatus according to supplementary note 8, wherein
the database management means (205) hides, when displaying information stored in the database (60), the encrypted authentication information.

(Supplementary Note 10)

The control apparatus according to any one of supplementary notes 1 to 9, wherein
the database (60) is a Home Subscriber Server (HSS).

(Supplementary Note 11)

The control apparatus according to any one of supplementary notes 1 to 10, wherein
the subscriber information in which at least the authentication information is encrypted is generated by a Subscriber Identity Module (SIM) provider.

(Supplementary Note 12)

The control apparatus according to any one of supplementary notes 1 to 11, wherein
the acquisition means (101, 201) acquires the subscriber information stored in a storage medium, acquires the subscriber information via a network, or acquires the subscriber information from a two-dimensional code including the subscriber information.

(Supplementary Note 13)

A radio communication system including:
an acquisition means (101, 201) for acquiring subscriber information in which at least authentication information is encrypted; and
a registration means (102, 203) for registering the acquired subscriber information in a database included in a core network.

(Supplementary Note 14)

A control method including:
in a control apparatus (30) controlling mobility of a terminal apparatus (20),
acquiring subscriber information in which at least authentication information is encrypted; and
registering the acquired subscriber information in a database (60) included in a core network (12).

(Supplementary Note 15)

A recording medium having recorded thereon a program causing a computer installed in a control apparatus controlling mobility of a terminal apparatus to execute:
processing of acquiring subscriber information in which at least authentication information is encrypted; and
processing of registering the acquired subscriber information in a database included in a core network.

The respective configurations of supplementary notes 13 to 15 can be developed into any one of the configurations of supplementary notes 2 to 12 in the same way as in the case of supplementary note 1.

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

This application claims priority based on JP 2019-053016 filed on Mar. 20, 2019, the entire disclosure of which is incorporated herein.

INDUSTRIAL APPLICABILITY

In a radio communication system run by a user, security can be enhanced.

REFERENCE SIGNS LIST

10 Base Station
11 Radio Access Network
12 Core Network
20, 20-1, 20-2, 20-3 Terminal Apparatus
30 Control Apparatus
40 Relaying Apparatus
50 Gateway Apparatus
60 Subscriber Information Database
70 Server of SIM Provider
80 Database
90 AAA server
91 Access Point (AP)
92 PDG
100 Control Apparatus
101 Acquisition Section
102, 203 Registration Section
201 Communication control Section
202 Key Generation Section
204 Authentication Section
205 Database management Section
311 Processor
312 Memory
313 Input and Output Interface
314 Communication Interface

What is claimed is:

1. A control apparatus comprising:
a memory storing instructions; and
one or more processors configured to execute the instructions to:
- acquire subscriber information in which at least authentication information is encrypted;
- decrypt the authentication information in ciphertext included in the subscriber information acquired by the control apparatus to extract the authentication information in plaintext;
- encrypt the authentication information in plaintext based on individual information of an operator of the core network; and
- register the encrypted authentication information in the database included in the core network,
- wherein the one or more processors are further configured to use the individual information of the operator of the core network to generate a common key for encrypting the authentication information in plaintext, and
- wherein said control apparatus controls mobility of a terminal apparatus.

2. The control apparatus according to claim 1, wherein the one or more processors are further configured to:
- decrypt the encrypted authentication information; and
- use the decrypted authentication information and authentication information included in a connection request from the terminal apparatus to the core network to authenticate the terminal apparatus.

3. The control apparatus according to claim 2, wherein
the authentication information is encrypted using a public key by an external apparatus, and
the one or more processors are further configured to decrypt the encrypted authentication information using a private key corresponding to the public key.

4. The control apparatus according to claim 1, wherein the one or more processors are further configured to, when the authentication information included in the subscriber information is not encrypted, encrypt the authentication information, and registers the subscriber information including the encrypted authentication information in the database thereafter.

5. The control apparatus according to claim 1, wherein the one or more processors are further configured to:
manage the database; and
control import and export of data stored in the database.

6. The control apparatus according to claim 5, wherein the one or more processors are configured to hide, when displaying information stored in the database, the encrypted authentication information.

7. The control apparatus according to claim 1, wherein the database is a Home Subscriber Server (HSS).

8. The control apparatus according to claim 1, wherein the subscriber information in which at least the authentication information is encrypted is generated by a Subscriber Identity Module (SIM) provider.

9. The control apparatus according to claim 1, wherein the one or more processors are further configured to acquire the subscriber information stored in a storage medium, acquires the subscriber information via a network, or acquires the subscriber information from a two-dimensional code including the subscriber information.

10. A radio communication system comprising one or more apparatuses each including a memory storing instructions and one or more processors configured to execute the instructions, the one or more apparatuses being configured to:
- acquire subscriber information in which at least authentication information is encrypted;
- decrypt the authentication information in ciphertext included in the subscriber information acquired by the control apparatus to extract the authentication information in plaintext;
- encrypt the authentication information in plaintext based on individual information of an operator of the core network; and
- register the encrypted authentication information in the database included in the core network,
- wherein the one or more apparatuses are further configured to use the individual information of the operator of the core network to generate a common key for encrypting the authentication information in plaintext, and
- wherein said one or more apparatuses control mobility of a terminal apparatus.

11. A control method comprising:
in a control apparatus controlling mobility of a terminal apparatus,
acquiring subscriber information in which at least authentication information is encrypted;
decrypting the authentication information in ciphertext included in the subscriber information acquired by the control apparatus to extract the authentication information in plaintext;
encrypting the authentication information in plaintext based on individual information of an operator of the core network; and
registering the encrypted authentication information in the database included in the core network,
wherein the control method further comprises using the individual information of the operator of the core network to generate a common key for encrypting the authentication information in plaintext.

* * * * *